(12) United States Patent
Pelekhaty et al.

(10) Patent No.: US 11,563,687 B2
(45) Date of Patent: Jan. 24, 2023

(54) CONTROLLING DISTRIBUTED BUFFERS IN A NETWORK TO MANAGE DATA PACKETS

(71) Applicant: Ciena Corporation, Hanover, MD (US)

(72) Inventors: Vladimir Pelekhaty, Baltimore, MD (US); Michael Y. Frankel, Bethesda, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/167,348

(22) Filed: Feb. 4, 2021

(65) Prior Publication Data

US 2022/0247687 A1 Aug. 4, 2022

(51) Int. Cl.
*H04L 47/122* (2022.01)
*H04L 47/30* (2022.01)
*H04L 43/0882* (2022.01)
*H04L 41/22* (2022.01)
*H04L 47/62* (2022.01)

(52) U.S. Cl.
CPC ............ *H04L 47/122* (2013.01); *H04L 41/22* (2013.01); *H04L 43/0882* (2013.01); *H04L 47/30* (2013.01); *H04L 47/6225* (2013.01)

(58) Field of Classification Search
None
See application file for complete search history.

(56) References Cited

U.S. PATENT DOCUMENTS

| | | | |
|---|---|---|---|
| 8,054,840 B2 | 11/2011 | Booth et al. | |
| 9,124,383 B1 | 9/2015 | Frankel et al. | |
| 2008/0075071 A1 | 3/2008 | Beshai | |
| 2010/0271955 A1* | 10/2010 | Atsumi | H04L 47/6215 370/389 |
| 2010/0272117 A1* | 10/2010 | Wu | H04L 49/101 370/413 |
| 2011/0064086 A1 | 3/2011 | Xiong et al. | |
| 2011/0243136 A1 | 10/2011 | Raman et al. | |
| 2012/0287785 A1* | 11/2012 | Kamble | H04L 49/70 370/230.1 |
| 2012/0327779 A1* | 12/2012 | Gell | H04L 47/2475 370/235 |
| 2013/0108259 A1 | 5/2013 | Srinivas et al. | |
| 2013/0108263 A1 | 5/2013 | Srinivas et al. | |

(Continued)

OTHER PUBLICATIONS

Singla et al., "Jellyfish: Networking Data Centers Randomly," arXiv:1110.1687v3 [cs.NI] Apr. 20, 2012.

(Continued)

*Primary Examiner* — Dhairya A Patel
(74) *Attorney, Agent, or Firm* — Clements Bernard Baratta; Lawrence A. Baratta, Jr.; Christopher L. Bernard

(57) ABSTRACT

Systems, methods, and computer-readable media are provided for controlling the distribution of data packets to intermediate buffers, such as Virtual Output Queues (VOQs) of a group of nodes. A method, according to one implementation, includes a step of detecting traffic congestion metrics associated with an egress port of a destination node grouped in a set of related nodes in a network. Each of the related nodes includes a dedicated buffer device. Based on the detected traffic congestion metrics, the method further includes the step of distributing data packets, which are intended for transmission to the egress port of the destination node, intermediately to the dedicated buffer device of one or more of the related nodes.

17 Claims, 13 Drawing Sheets

(56) References Cited

U.S. PATENT DOCUMENTS

| | | |
|---|---|---|
| 2013/0108264 A1 | 5/2013 | Deruijter et al. |
| 2013/0117449 A1 | 5/2013 | Hares et al. |
| 2013/0287397 A1 | 10/2013 | Frankel et al. |
| 2013/0322443 A1 | 12/2013 | Dunbar et al. |
| 2014/0153924 A1 | 6/2014 | Deruijter |
| 2014/0229944 A1 | 8/2014 | Wang et al. |
| 2014/0270762 A1 | 9/2014 | Li et al. |
| 2015/0076923 A1 | 3/2015 | Frankel et al. |
| 2015/0085647 A1* | 3/2015 | Hu .................. H04L 45/28 370/228 |
| 2015/0127797 A1* | 5/2015 | Attar ............... H04L 47/125 709/223 |
| 2015/0289176 A1* | 10/2015 | Liu .................. H04W 24/02 370/331 |
| 2017/0187629 A1 | 6/2017 | Shalev et al. |
| 2020/0007432 A1* | 1/2020 | McDonald ........ H04L 45/123 |

OTHER PUBLICATIONS

Jyothi et al., "Measuring and Understanding Throughput of Network Topologies," arXiv:1402.2531v3 [cs.NI] Feb. 9, 2015.

Farrington et al., Helios: A Hybrid Electrical/Optical Switch Architecture for Modular Data Centers, SIGCOMM'10, Aug. 30-Sep. 3, 2010, New Delhi, India. Copyright 2010 ACM 978-1-4503-0201-2/10/08.

Broadcom, High-Density 25/100 Gigabit Ethernet StrataXGS® Tomahawk Ethernet Switch Series BCM56960 Series, accessed Oct. 21, 2015.

Koibuchi et al., "Layout-conscious Random Topologies for HPC Off-chip Interconnects," The 19th International Symposium on High-Performance Computer Architecture (HPCA), Feb. 2013.

Doyle, "Lessons from Altoona: What Facebook's newest data center can teach us," Network World (http://www.networkworld.com/) on Apr. 14, 2015.

Calient, "LightConnect™ Fabric Virtual Pod Data Centers," http://www.calient.net/solutions/lightconnectfabricvirtualpod-datacenters/, accessed Oct. 21, 2015.

* cited by examiner

CONTROLLING DISTRIBUTED BUFFERS IN A NETWORK TO MANAGE DATA PACKETS

TECHNICAL FIELD

The present disclosure generally relates to networking systems and methods. More particularly, the present disclosure relates to distributed buffer memory devices arranged in a data center and systems and methods for managing packets in the distributed buffer memory devices.

BACKGROUND

FIG. 1 is a diagram showing a data center 10 where switches 12L, 12A, 12S within the data center 10 are arranged in a conventional Clos network configuration. The data center 10 may include a plurality of racks 14, where each rack 14 may include a Top of Rack (TOR) leaf switch 12L and a plurality of servers 16. Each leaf switch 12L within the rack 14 may include a plurality of internal ports 18 for connection with the respective servers 16. In this arrangement, servers 16 within a single rack 14 may communicate with each other via the directly-connected leaf switch 12L. For instance, communication from one server to another within a single rack 14 may include a first hop from a first server to the leaf switch 12L and a second hop from the leaf switch 12L to a second server.

The Clos network in this data center 10 includes a first layer 20 (e.g., "leaf" layer) of leaf switches 12L that are arranged within the racks 14. Furthermore, the Clos network includes a second layer 22 (e.g., "aggregation" layer) of aggregation switches 12A and a third layer 24 (e.g., "spine" layer) of spine switches 12S. The Clos arrangement includes a first set of links 26 between the leaf switches 12L and the aggregation switches 12A and a second set of links 28 between the aggregation switches 12A and the spine switches 12S.

The portions of a telecommunications network that are typically incorporated within data centers, enterprise networks, Local Area Networks (LANs), High Performance Computing (HPC) environments, or other well-defined network environments are usually built with a highly-structured architecture. Some examples of highly-structured architectures that are frequently used within modern data center networks include Fat Tree, Clos, Dragonfly, Slim Fly, and B-Cube. These highly-structured network architectures are easy to visualize, can be built from smaller building blocks, provide high bisectional bandwidth, etc.

In addition to the overall network, the internal structure of traditional spine switches 12S and aggregation switches 12A is based on systems having a multi-stage Clos architecture. There are many examples of such systems in the industry. A typical configuration may be based on integrated circuits that include fully-featured Ethernet switches, which are deployed at a client-facing "edge" and provide packet processing (e.g., deep buffering, scheduling, shaping, prioritization, etc.) and framing packets into standard size cells. An example of the integrated circuits includes Jericho System-on-Chip (SoC) switch-router chips from Broadcom. A centralized fabric is composed of much simpler fabric element switches, which only support a very simple standard-size cell forwarding and minimal buffering.

The SoC switch-router chips also implement a Virtual Output Queue (VOQ) function, whereby a transmitter (TX) port indicates the amount of traffic that is buffered to a particular receiver (RX) destination port, and the RX maintains a record of such requests and issues TX credits to make sure that the RX port is not oversubscribed. Thus, the RX controls traffic injection into the system, while most buffering occurs at the TX side. The architecture is based on Clos configuration, such that a centralized switch fabric is deployed on day one of establishing a data center. Since each path is the same length, cells are forwarded via random paths (e.g., Equal-Cost Multi-Path (ECMP) routing) without controlling flow paths. Also, there may be a cell order reassembly at the RX ports.

The Clos-based configuration with VOQ buffering may be simple to operate, follows well-accepted industry standards, and may be efficient when fully filled. However, it also has a number of drawbacks. First, the centralized switch fabric of the Clos system must be deployed on day one, regardless of the number of client connections. Also, depending on the overall system port count, the system may include several layers of fabric element switches that are required, with a large fraction of ports (i.e., which increases the cost, size, and power being consumed) for internal scale-out interconnect.

Another drawback is that packets in the Clos system are buffered exclusively at the ingress to the large composite switch. Therefore, sufficient memory and memory bandwidth must be allocated to deal with local ingress packet congestion. Ingress memory must be sized such that each individual ingress location can fully deal with local congestion.

Clos type multi-layer fabrics need some redundancy and may have resilience limitations, depending on how many centralized elements are deployed and in what configuration. Lower cost configurations generally have reduced resilience to failures. Also, Clos configurations have lower throughput, higher latency, higher cost, and higher power compared to flat networks described with respect to the embodiments defined below. Also, longer Clos cables require more expensive Active Optical Cables (AOCs), instead of Direct Attach Cables (DACs). Existing products force a single physical mode for their fabrics: 100% on PCB traces or 100% on cables, not both.

Furthermore, it is common that data traffic can experience congestion at an egress port of a node in the network. For example, congestion may be the result of "incasting" in which an excessive amount of traffic is directed to a single egress port (e.g., User-Network Interface (UNI) port, client-facing port, receiving port, destination port, etc.) of a node. Congestion (e.g., incasting) is common in data centers and WAN cross-connects, switches, routers, etc.

Taking the case when ingress ports and egress ports have an identical bandwidth, a designated full-bandwidth transmission between a single ingress (source) port and a single egress (destination) port typically does not present any problems since moderately deep output queues (at or near the egress port) are able to take adequate care of statistical irregularities of packet arrival after the packets traverse the network.

However, problems may arise during incasting situations when several ingress ports (e.g., Network-Network Interface (NNI) ports, network-facing ports, transmitting ports, source ports, etc.) try to send too much traffic to a single egress port within a certain time period such that the excessive traffic may overwhelm an output buffer associated with the single egress port. Other incasting problems may arise as a result of an ingress port transmitting an excessive amount of data to the egress port in a burst (i.e., within a short time frame). For example, such a burst of high-volume data might overwhelm an already-loaded egress port.

A first existing approach to mitigating this problem includes reducing the rate of transmission over the network. A second existing approach includes storing surplus data in high-capacity (multi Gigabyte) high-bandwidth memory (HBM) at the transmitter or ingress port. However, these approaches may be either inapplicable to the data center environment or may be costly and inefficient. Therefore, there is a need to overcome these deficiencies in the known solutions.

Several conventional congestion prevention techniques rely on different control algorithms for their implementation. Some of them, which may be configured to possess the original source of data to be transmitted, have the ability to throttle down the transmission rate of the original data to be transmitted, as described in "*DCQCN+: Taming Large-scale Incast Congestion in RDMA over Ethernet Networks,*" 2018 IEEE 26th International Conference on Network Protocols, p. 110. A control loop in this example includes detection of congestion (or a condition that is near congestion) at the egress site and sending feedback requesting Proportional-Derivative (PD) congestion control to the senders. The PD congestion feedback request may include both the excess of the desired queue occupancy and its rate. The senders reduce the transmission rate linearly with the received feedback. This approach requires access to the original source of data to be transmitted and control of the data transmission rate, which often is not an option in data centers.

Other existing approaches store excess packets at an ingress site in corresponding Virtual Output Queues (VOQs) when incasting occurs. For example, incasting may refer to a "many-to-one" situation where traffic congestion results from an excessive data transport from multiple ingress ports of a node (e.g., switch, router, etc.) to a single egress port. Besides the need for expensive and power-hungry high capacity HBM, which may be empty most of the time, the control loop may include a complicated credit request/credit grant exchange, as described in "*Stardust: Divide and Conquer in the Data Center Network,*" 16th USENIX Symposium on Networked Systems Design and Implementation, p. 141. Ingress sites accumulate packets over a time window and request permission to send these to the egress sites. The egress site maintains a record of such requests from all ingress sites, determines its ability to handle egress, and sends corresponding "send permission grants" to appropriate ingress sites. This procedure prevents overload of both the egress sites and the internal switch network and provides packet delivery fairness. However, this procedure is done at the expense of complex request/grant message passing as well as corresponding communication time delays.

The existing approaches to prevent congestion that utilize rate-based transmission control may be implemented in data centers as Data Center Transmission Control Protocol (DCTCP), Data Center Quantized Congestion Notification (DCQCN), DCQCN+, just to name a few. These systems are adapted to constantly exchange Explicit Congestion Notifications (ECNs) and Congestion Notification Packets (CNPs) between senders, switches, and receivers to diagnose and evaluate congestion conditions. The sender increases/decreases its sending rate according to the congestion condition. These approaches explicitly operate at Layer 3 and imply the access to and control of the source of the original data to be transmitted to rate control source data.

The conventional systems include a number of shortcomings. For example, the rate-based congestion control schemes explicitly imply the access to and control of the source of the original data to be transmitted to execute the Proportional-Derivative (PD) transmission data rate actuation without any loss of data. This is possible if the transmission site is in full possession of the data to be transmitted, as if it is in permanent storage at the site. However, this situation does not commonly occur in large composite switches, where client interfaces are usually re-transmitting data originated somewhere else. Hence, these approaches may not be feasible in many cases.

Local buffering at the transmission site is burdened by the need for expensive and power-hungry high-capacity (e.g., multi-Gigabyte) High-Bandwidth Memory (HBM), which would normally be empty and idle most of the time. The implementation of the local VOQ buffering is also overburdened by a complicated system of administering the release of packets stored in VOQs, which may involve the constant exchange of requests for packet release and grants to release them between the senders and receivers. These complex and cumbersome systems are overburdened with meticulous processing and sequential communications, causing both processing and communication delays and reducing the data throughput.

Therefore, there is a need to provide a data center architecture and large composite switch architecture that is able to overcome the drawbacks of the conventional systems. Also, data centers and large composite switches may benefit by having a way to gradually grow or scale to different internal network sizes based on current demand and the number of services being offered to customers.

BRIEF SUMMARY

The present disclosure describes various embodiments of programmable switches having programmable interfaces and interconnect networks having a topology that is configurable based on how the interfaces are established in the programmable switches. For example, the interfaces may be programmed as user-facing interfaces or fabric-facing interfaces. In some embodiments, the topology of the interconnect network may have a one-level or flat architecture that allows either a full-mesh or partial mesh configuration.

According to one implementation, a non-transitory computer-readable medium is configured to store logic having instructions that, when executed, enable a processing device to detect traffic congestion metrics associated with an egress port of a destination node grouped in a set of related nodes in a network. Each of the related nodes includes a dedicated buffer device. Based on the detected traffic congestion metrics, the instructions further enable the processing device to distribute data packets, which are intended for transmission to the egress port of the destination node, intermediately to the dedicated buffer device of one or more of the related nodes.

According to another implementation, a control system includes an interface configured to communicate with a plurality of related nodes grouped in a set of nodes in a network, where each related node includes a dedicated buffer device. The control system also includes a processing device in communication with the interface and a memory device configured to store logic. The logic has instructions that, when executed, enable the processing device to detect traffic congestion metrics associated with an egress port of a destination node of the plurality of nodes. Based on the detected traffic congestion metrics, the instructions enable the processing device to distribute data packets, which are intended for transmission to the egress port of the destination node, intermediately to the dedicated buffer device of one or more of the related nodes.

According to yet another implementation, a method includes the step of detecting traffic congestion metrics associated with an egress port of a destination node grouped in a set of related nodes in a network, where each of the related nodes including a dedicated buffer device. Based on the detected traffic congestion metrics, the method further includes the step of distributing data packets, which are intended for transmission to the egress port of the destination node, intermediately to the dedicated buffer device of one or more of the related nodes.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
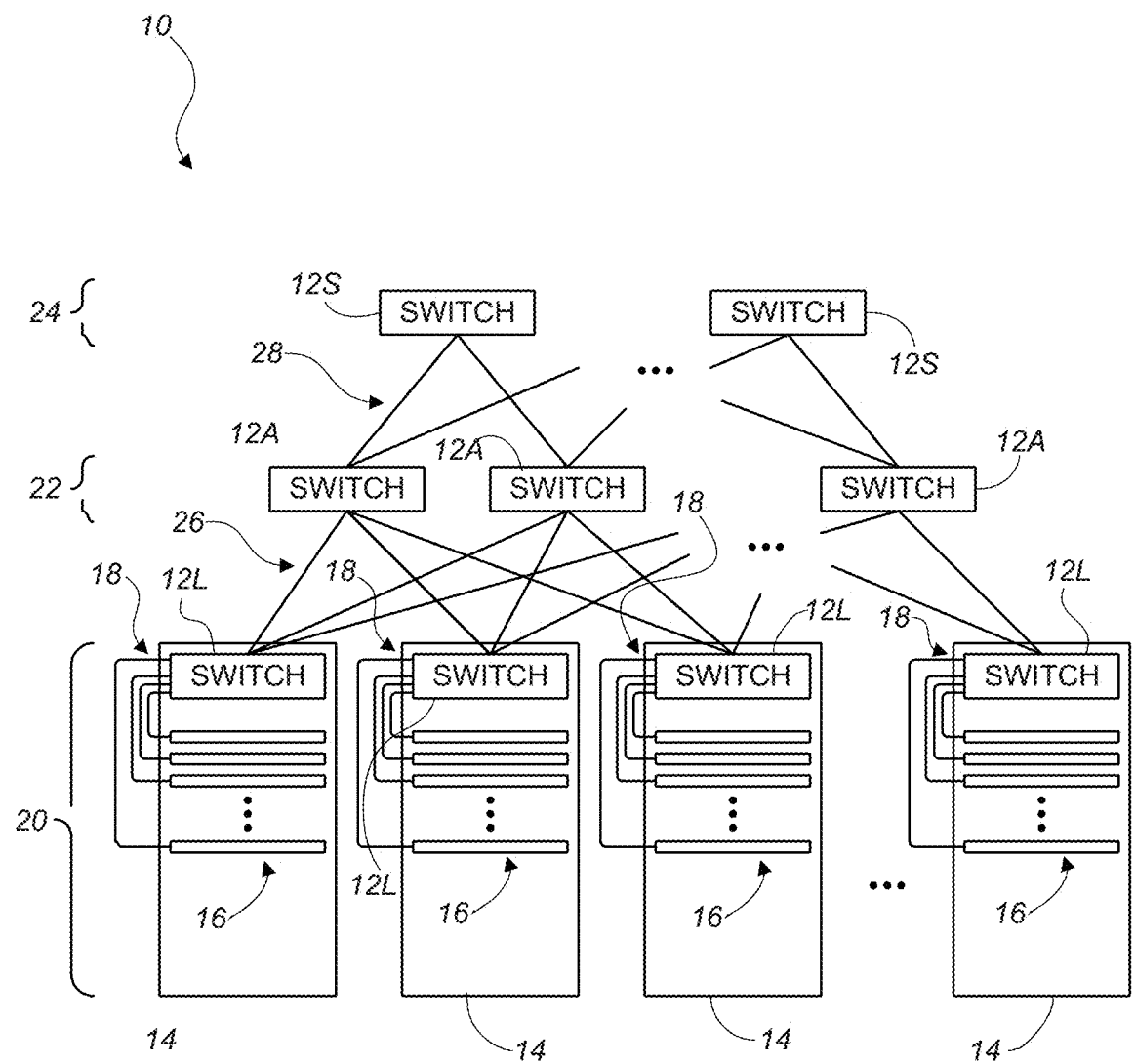
FIG. 1 is a diagram showing a data center arranged in a conventional Clos network configuration.

The present disclosure relates to data centers, large composite switches or other sections of a communications network having distributed memory (e.g., buffer memory components) throughout network. For example, in some embodiments, each switch device in the network may be configured with buffer memory for creating a distributed system of memory components. The concept of distributing memory may be implemented in a network having any type of network topology, such as a multi-level architecture (e.g., Clos) or a one-level (or "flat") architecture. According to some of the preferred embodiments of the present disclosure, the distributed memory is applied to a flat network.

More particularly, the data centers or large composite switches of the present disclosure include programmable switches, whereby the switches may be programmed such that the ports of each switch can be configured as a "user-facing" interface or a "fabric-facing" interface. User-facing interfaces/ports may also be referred to as User-Network Interfaces (UNIs). Also, fabric-facing interfaces/ports and internal ports may also be referred to as Network-Network Interface (NNIs). The fabric-facing interfaces of the various switches can be interconnected to form a mesh-like network, which may be arranged in a one-level or "flat" configuration. The present disclosure also relates to systems and methods for programming the switches of the data center in a manner that allows for continued growth of the data center to provide a greater level of operation at each stage of growth with respect to latency, efficiency, power consumption, etc.

The implementations of the present disclosure may be based on a flat network architecture and may further include features that provide certain advantages over other flat networks like Slim Fly, Dragonfly, B-Cube, etc. It should be noted that the topological network-side (or fabric-facing) connections, although described in the present disclosure as single links, may also include multiple parallel physical links as needed to support a required bandwidth.

Testing has been performed to analyze various characteristics of the conventional systems versus new configurations described according to the embodiments of the present disclosure. Packet-level simulations were performed on both the conventional Clos-type networks, as well as flat-mesh configurations as described herein. The simulations were extended to capture packet latency. Although simulations were performed without direct measurements on the commercial devices, the results of the simulations were cross-checked against published results with respect to throughput. The published results matched the packet simulations quite well, giving confidence in the overall analysis.

It was observed from this testing that there was a reasonable match between the published results and the Clos packet modeling data. A flat network, according to the embodiments described with respect to the present disclosure, provided a much better throughput. In the simulations, the maximum allowed queue length was short (e.g., 8). Compared to the conventional system, the present systems (including a flat network architecture) were able to handle "adversarial" traffic patterns. The flat network of the present disclosure was able to deliver much higher throughput and much lower latency compared to a conventional Clos configuration.

Regarding latency, the Clos arrangement showed expected behavior, whereby longer queues lowered drop rates. However, this also substantially increased the latency compared to the embodiments of the systems of the present disclosure. The flat network of the present disclosure showed much lower maximum and average latency while simultaneously having a lower drop rate.

Also, the component counts for the two systems were compared. The chassis switches implemented in the Clos network versus the flat network showed substantial advantages accruing to the flat networks. In a realistic comparison between the implementations for Clos and flat networks, a Clos baseline included a client interface card of 30 client ports and 40 fabric ports (with protection redundancy), a fabric card of 32 fabric ports, with the overall configuration providing 480 total client ports (i.e., 16 client interface cards times 30). This configuration has 480 internal fabric links. In a flat network, no fabric cards are needed, and the number of fabric links may be reduced to 380 fabric links (with intrinsic resilience). Thus, a flat network provides substantial reduction in fabric card and fabric link counts. Also, the flat network can have a smaller size, lower cost, and smaller power consumption while also preserving the other advantages.

Also, client use connections (i.e., user-facing interfaces) may be provided at each switch element as needed. The bandwidth ratio between Network-to-Network Interfaces (NNIs) (via fabric-facing interfaces) and User-to-Network Interfaces (UNIs) (via user-facing interfaces) may be used to determine an oversubscription ratio. In general, the number of NNI ports is greater than the number of UNI ports to allow the NNI links to support both local aggregation as well as express traffic bandwidth. Although the present disclosure describes "switches," these components may also include routers, nodes, cards, Application-Specific Integrated Circuits (ASICs), programmable protocol independent devices (e.g., Protocol-Independent Switch Architecture (PISA™) type switches or other protocol agnostic devices), etc.

Large-scale multi-terabit routers (and switches) may be needed to sustain the continued growth of communication networks. Such routers may be used extensively across all networking markets, including spine switches inside data centers, peering routers in network cross-connects, packet edge routers in access and metro networks, and as core routers in long haul networks. A commercial example may include the router chassis with line cards, which may be used both inside data centers and in Wide Area Networks (WANs).

Generally, it is desirable that a switch (or router) is configured such that it can provide one or more of the following features or results:

a) Low latency and full (i.e., 100%) throughput, even at full packet load from client interfaces, b) Support for industry standard protocols at client interfaces, c) Scalable to 100s of Terabits, d) Graceful scaling curve with low day-one cost and pay as you grow trajectory, e) Include diverse supply chain of commercial ASIC or FPGA as building blocks, f) Avoid expensive custom development of any hardware components (e.g., electrical or optical components), Although conventional switches may be able to meet or include some of these features, none are configured to meet all of them. However, the embodiments of programmable switches and gradual-growth architecture described in the present disclosure are configured to satisfy most or all of these features.

In addition to programming the switching nodes in a network, the present disclosure is further configured to provide "distributed memory" throughout the network. For example, each node may be configured with Virtual Output Queue (VOQ) devices, User-Network Interface Queue (UNIQ) devices, and Network-Network Interface Queue (NNIQ) devices. The UNIQ devices may be associated with (e.g., configured at or near) the user-facing UNIs (e.g., ingress ports) of the switching node and the NNIQ devices may be associated with (e.g., configured at or near) the fabric-facing NNIs (e.g., egress ports) of the switching node. The VOQ devices may be used intermediately between the UNIQ devices and NNIQ devices.

With distributed memory, packets may take at least one-hop inside the network before being buffered in VOQ memory. VOQ memory is allocated from a pool distributed among all switching nodes within a policy-defined set (which may cover all the nodes in the network), in contrast to traditional local VOQ buffering at a single source node. Packets may be sent to the VOQs within the set in a "round-robin" order, which tends to provide better results compared to a randomly-distributed process. In some embodiments, the distribution order may include weighted distribution, a pseudo-random order, and/or other various techniques.

The state of distributed buffering may be controlled by the UNIQ devices at the egress ports. The UNIQ devices may be configured to monitor the egress ports and may detect when the queue occupancy exceeds pre-set thresholds. The "queue occupancy" or "UNIQ occupancy" may be associated with and/or may be defined by the activity level of the queue, the length/extent of data occupancy within the queue, or other related characteristics. In response to detecting the queue occupancy of the UNIQ, full-set VOQ buffering and VOQ packet release rates may be controlled as a full set.

According to one embodiment, the release of packets from the VOQ can be set at a rationed rate. The rationed rate factor can be controlled in accordance with UNIQ threshold conditions. In another embodiment, the release of VOQ packets can include a binary start/stop in accordance with the UNIQ threshold conditions. In other embodiments, the release of VOQ packets can include periodic UNIQ occupancy messages at fixed time intervals and the VOQ release rate may be set inversely proportional to UNIQ occupancy (and number of VOQs in a set).

In contrast to existing approaches, it is not necessary to send any messages or information from an ingress port to an egress port. The control messaging of the present disclosure may be sent only from egress to distributed node VOQs in a policy-defined set.

Also, flat topology networks with partial-mesh configurations allow the network to be built with a wide variety of node counts and small diameters with limited radix switches. The increase in the number of nodes provides correspondingly large number of sites for distributed buffering. In flat incomplete-mesh topology networks, there are various embodiments for utilizing all of them, or, if necessary, to limit the distributed buffering to the nearest neighboring nodes (as in full-meshes), or, for extending the set of sites for distributed buffering to the nearest neighboring sites of both the source node and destination node, as well as to allow distributed buffering at nodes up to two or more hops away.

Figure 5:
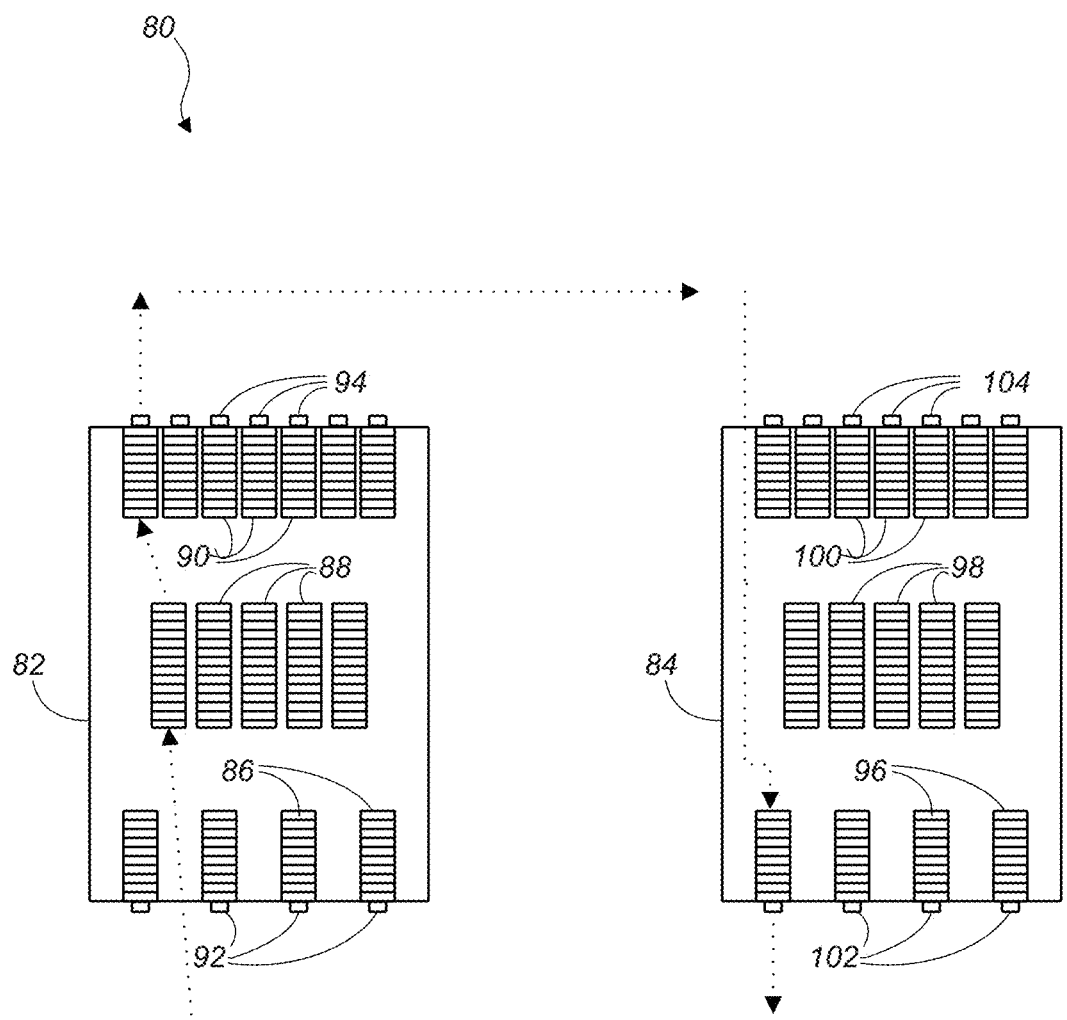
FIG. 5 is a diagram illustrating utilization of distributed buffer memory devices in a source node only in an embodiment of a portion of a network having at least a source node and a destination node.

State-of-the-art solution that utilizes local Virtual Output Queues (VOQs) buffer memory devices in a source node only is illustrated in FIG. 5 and may be incorporated in chassis switches as an option. Under congestion conditions detected at the egress site on the right, at the ingress site on the left in FIG. 5 the data arriving through the client UNI port (dashed arrow) is directed to the bottom of local VOQ in FIFO manner to be subsequently popped up out from the top of VOQ and into the appropriate NNI queue for eventual delivery through the network to the receiver site on the right.

Figure 9:
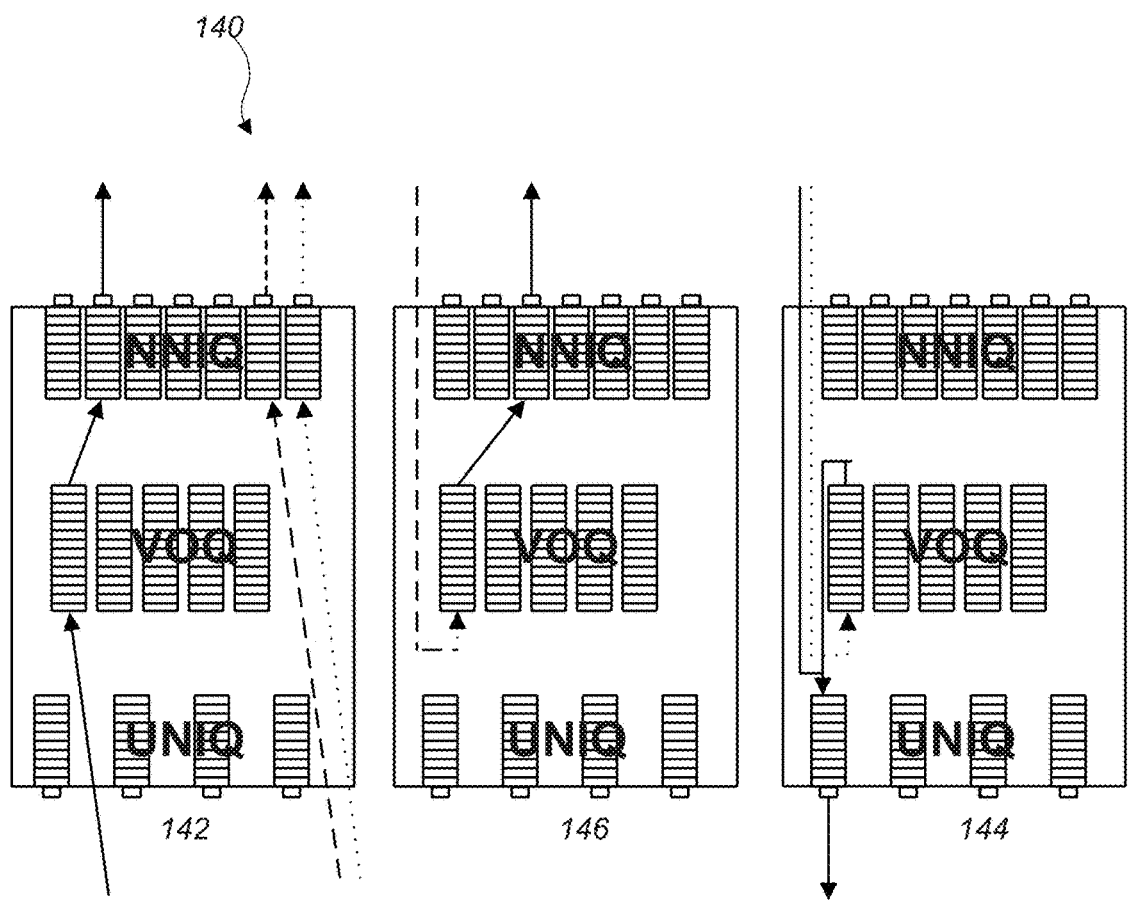
FIG. 9 is a diagram illustrating utilization of distributed buffer memory devices in a source node, intermediate storage node, and destination node, according to various embodiments of the present disclosure.

Distributed buffer memory concept is illustrated in FIG. 9. Under congestion conditions detected at the egress site on the right, at the ingress site on the left in FIG. 9 the data arriving through the client UNI port (illustrated by arrows pointing from the bottom up) is directed for the distributed buffering in one of the three types of nodes: source node (left), intermediate node (center) and destination node (right). Buffering at the source node is similar to the state-of-the-art solution that utilizes local Virtual Output Queues (VOQs) buffer memory devices in a source node only as illustrated in FIG. 5. In this case the data arriving through the client UNI port (illustrated by solid arrows) is directed to the bottom of the local VOQ in FIFO manner to be subsequently popped up out from the top of VOQ and into the appropriate NNI queue and port (solid arrow at the top pointing up toward the network) for eventual delivery to the receiver site on the right destined for egress UNIQ at destination node.

Distributed buffering at the intermediate node is shown in the center of FIG. 9. In this case the data arriving through the client UNI port on the left of FIG. 9 (illustrated by dashed arrows) is directed for the remote storage at the intermediate node and to the bottom of its VOQ in FIFO manner to be subsequently popped up out from the top of VOQ (solid arrow) and into the appropriate NNI queue and port (dashed arrow at the top pointing up toward the network) for eventual delivery through the network to the receiver site on the right of FIG. 9 destined for egress UNIQ at destination node.

Distributed buffering at the destination node is shown on the right of FIG. 9. In this case the data arriving through the client UNI port on the left of FIG. 9 (illustrated by dotted arrows) is directed for the storage at the destination node through the NNI queue and port (dotted arrow at the top pointing up toward the network) for eventual delivery through the network to the destination node on the right of FIG. 9 and to the bottom of its VOQ in FIFO manner to be subsequently popped up out from the top of VOQ (solid arrow) and into the appropriate UNI queue for eventual delivery through the network to the receiver site on the right.

It is understood that packets using distributed buffering may be buffered at ingress, intermediate and destination node of the network.

Besides the need for expensive and power-hungry high capacity (multi Gigabyte) high bandwidth memory (HBM), which would be empty and idle most of the time, as it will be shown below, the implementation of the local VOQ buffering use complex system of controlling the release of packets stored in VOQs. Incasting ingress sites send requests for the release of the packets from their VOQs. These requests, upon receipt by the incasted egress site, are FIFOed and processed sequentially by the egress scheduler with subsequent grants for the release of the packets being sent back to the requesters. This complex and cumbersome system requires meticulous processing and sequential communications, causing both processing and communication overhead and reducing the data throughput.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Distributed Buffer Memory

Figure 2:
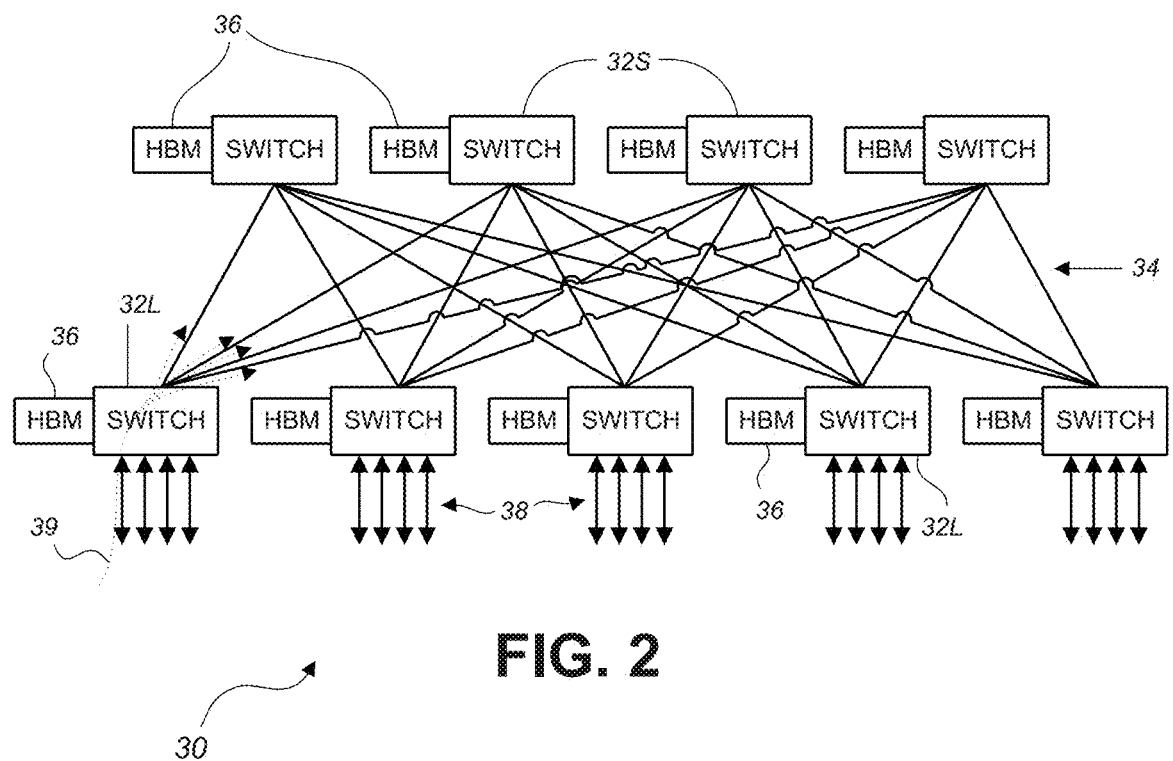
FIG. 2 is a diagram showing a data center with distributed memory arranged in a two-level Clos network configuration, according to various embodiments of the present disclosure.

FIG. 2 is a diagram showing an embodiment of a data center 30 (or other section of a network) arranged in a two-level Clos network configuration. This and other network configurations are described in related U.S. patent application Ser. No. 16/940,621, filed Jul. 28, 2020, the contents of which are incorporated by reference herein. In this embodiment, the data center 30 include a plurality of switches 32L, 32S arranged in two levels, where switches 32L shown on the lower level may be configured as leaf switches and the switches 32S shown on the higher level may be configured as spine switches. Each of the switches 32L on the lower level are connected to the switches 32S on the higher level via links 34. Also, each switch 32L, 32S is connected to a respective High Bandwidth Memory (HBM) unit 36 (or other suitable types of buffer memory components). The HBM units 36 may include high capacity (e.g., multi-Gigabyte) memory modules or buffer memory components, which may be relatively expensive and typically require a large amount of power. Similarly, data interfaces (not shown) between the switches 32L, 32S and their respective HBM units 36 are also relatively expensive and power hungry.

Conventional switches (or routers) may use a Virtual Output Queue (VOQ) construct, whereby overflow packets are detected at an egress port of the switch, while actual buffering occurs on an ingress port of the switch. With VOQ, packets may be physically buffered in ingress port, but buffering decisions may be controlled by a remote egress output port. This construction prevents overloading both the egress port and the internal fabric of the switch. However, packet buffering is localized, and large memory buffers have to be provided at each ingress module, sufficient to handle local worst-case buffering conditions. However, according to the embodiments of the present disclosure, the HBM units 36 are provided both at ingress modules and at modules that may be one-hop into the fabric. By combining HBM units 36 with each of the switches 32, as shown in FIG. 2, this arrangement may be applied to the two-level Clos architecture of the data center 30. Also, this arrangement (i.e., combination of switches 32 and HBM units 36) can be applied to any switch interconnect topology (e.g., Clos, Compound Graph, Expander, etc.).

The switches 32L of the two-level folded Clos architecture of FIG. 2 include user-facing interfaces 38 or ports, whereas the switches 32S are used merely for interconnection purposes. Incoming flow packets 39 are received at the user-facing interfaces 38 and are distributed or spread across multiple (or all) intermediate nodes (i.e., higher level switches 32S). The packets 39 may be distributed in a predetermined pattern, a pseudo-random pattern, an algorithmically determined pattern, a uniform pattern, or any other suitable types of strategic patterns for effective load distribution. In this way, the distribution of packets 39 can provide a balance to or improve the balancing of the internal network load to maximize or optimize the distribution, regardless of specific source-destination traffic pattern. Thus, instead of memory only at an ingress level (including switches 32L), buffer memory components may also be distributed to switches 32S one hop (or more) from the ingress level.

Since packets may be pseudo-randomly spread across the internal fabric of the data center 30, any packet congestion that needs to be buffered can use the full distributed memory that is made up of the multiple HBM units 36 (or other suitable types of buffer memory components). Therefore, packet buffering can strongly benefit from statistical multiplexing. Also, because of statistical multiplexing, the size of individual HBM units 36 can be reduced proportionally, which, in some cases, may be reduced by a factor of about two or more. Another benefit is that the bandwidth of interfaces between switches 32 and the HBM units 36 can also be reduced by a similar factor.

In some cases, packets may arrive at the egress ports out of order. In order to recover the correct sequence of packets, the egress ports may be programmed to enable packet order recovery. For example, one example of packet order recovery is described in U.S. patent application Ser. No. 16/565,541, filed Sep. 10, 2019, entitled "Packet order recovery in a programmable edge switch in a data center network," the entire contents of which are incorporated by reference in the present disclosure.

Figure 3:
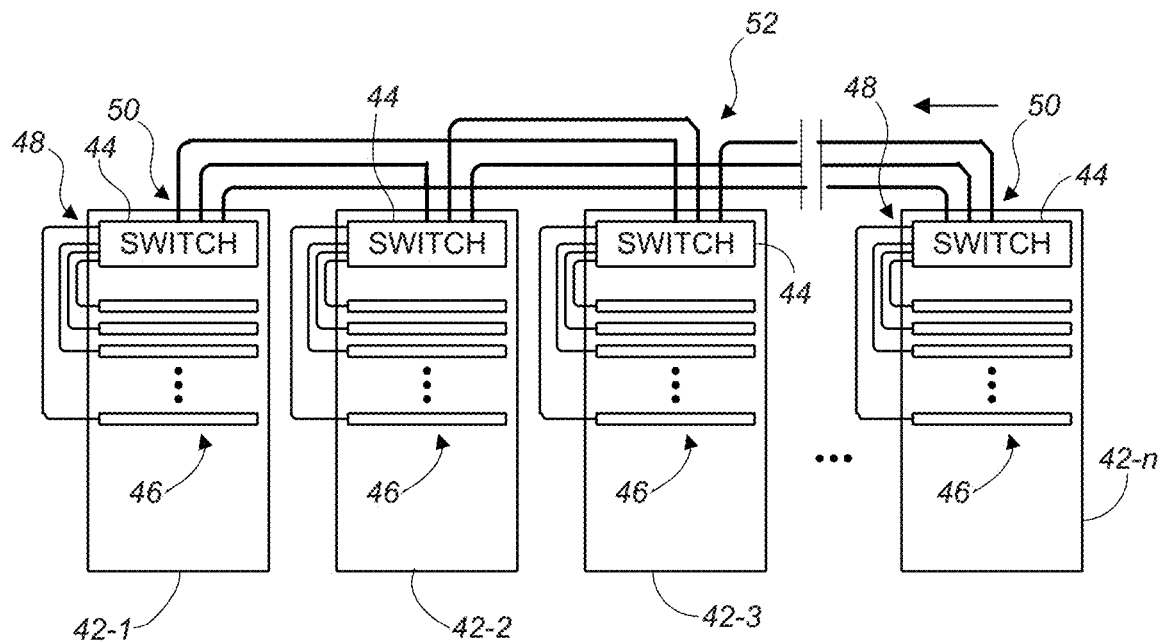
FIG. 3 is a schematic diagram illustrating a data center arranged in a one-level (or flat) configuration, according to various embodiments of the present disclosure.

FIG. 3 is a schematic diagram illustrating an embodiment of a data center 40 (or high-performance computing application, enterprise, LAN, or other network environment). In this embodiment, the data center 40 is arranged in a one-level (or "flat") configuration. The configuration includes a flat arrangement of interconnecting switches in the data center 40. The data center 40 in this example includes a number of racks 42-1, 42-2, 42-3, . . . , 42-n. Each rack 42 includes a switch 44, such as a TOR switch. Each switch 44 includes a number of internal ports 48 (e.g., UNI inward directed ports) dedicated for connection with a plurality of servers 46 (e.g., blade servers) within the respective rack 42. Each switch 44 also includes a number of external ports 50 (e.g., NNI outward directed ports) for direct connection with at least one other switch 44 within other racks 42. The direct interconnection of switches 44 may be made through electrical and/or optical transmission links 52 or interfaces. Each switch 44 may include two or more links 52 for connection with any two or more of the other switches 44 in the data center 40. According to the example shown in FIG. 3, each switch 44 includes three outward-directed ports 50, whereby three links 52 provide connection with three different switches 44. Also, as described below, the links 52 may include interconnections that form a loosely-structure or pseudo-random arrangement.

Further, the data center 40 may operate with an efficient routing protocol for loosely structured or unstructured networks such as the structured, rearranged network architecture. The routing protocol may include a protocol as described in U.S. patent application Ser. No. 16/656,783, filed Oct. 18, 2019, entitled "Routing tables for forwarding packets between switches in a data center network," the entire contents of which are incorporated by reference in the present disclosure.

Figure 4:
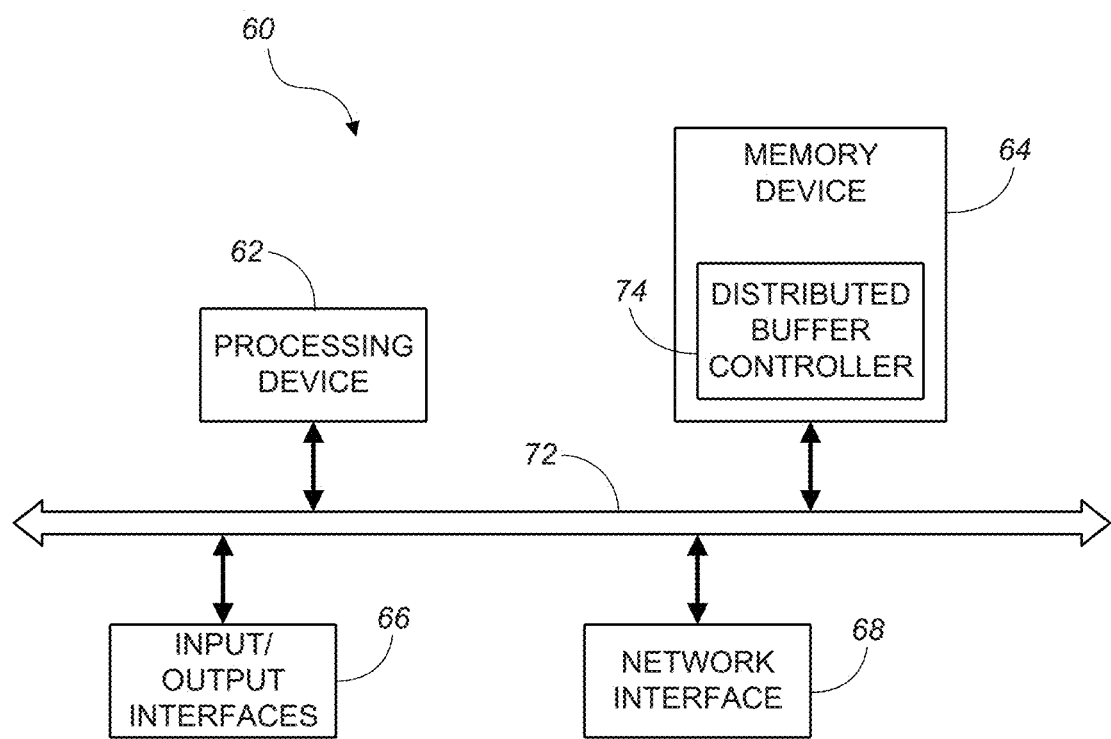
FIG. 4 is a block diagram illustrating a computing system for programming a number of switches in a data center, according to various embodiments of the present disclosure.

FIG. 4 is a block diagram illustrating a control system 60 for distributing data packets throughout a number of switches or nodes in a data center (e.g., data center 30, 40) of a communications network. In the illustrated embodiment, the control system 60 may be a digital computer that, in terms of hardware architecture, generally includes a processing device 62, a memory device 64, Input/Output (I/O) interfaces 66, and a network interface 68. The memory device 64 may include a data store, database, or the like. It should be appreciated by those of ordinary skill in the art that FIG. 4 depicts the control system 60 in a simplified manner, where practical embodiments may include additional components and suitably configured processing logic to support known or conventional operating features that are not described in detail herein. The components (i.e., 62, 64, 66, 68) are communicatively coupled via a local interface 72. The local interface 72 may be, for example, but not limited to, one or more buses or other wired or wireless connections. The local interface 72 may have additional elements, which are omitted for simplicity, such as controllers, buffers, caches, drivers, repeaters, receivers, among other elements, to enable communications. Further, the local interface 72 may include address, control, and/or data connections to enable appropriate communications among the components 62, 64, 66, 68.

According to one embodiment, the control system 60 may be configured to enable a data center (e.g., data center 30, 40) to grow (or scale) over time depending on the current need. For example, when a data center is first established, there may be fewer switches in use. However, as the data center grows, the data center at this later development stage can be updated to keep up with increased demand. In particular, a distributed buffer controller 74 may be stored in the memory device 64 for controlling the distribution of data in a distributed buffer arrangement in the switches (or nodes) of the data center. In some embodiments, the functions described with respect to the distributed buffer controller 74 may be implemented in any combination of hardware, software, and/or firmware in the processing device 62 and/or memory device 64.

The processing device 62 is a hardware device adapted for at least executing software instructions. The processing device 62 may be any custom made or commercially available processor, a Central Processing Unit (CPU), an auxiliary processor among several processors associated with the control system 60, a semiconductor-based microprocessor (in the form of a microchip or chip set), or generally any device for executing software instructions. When the control system 60 is in operation, the processing device 62 may be configured to execute software stored within the memory device 64, to communicate data to and from the memory device 64, and to generally control operations of the control system 60 pursuant to the software instructions.

It will be appreciated that some embodiments of the processing device 62 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 62 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 66 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 66 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 68 may be used to enable the control system 60 to communicate over a network or data center, such as the data center 30, 40, the Internet, a Wide Area Network (WAN), a Local Area Network (LAN), and the like. The network interface 68 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 68 may include address, control, and/or data connections to enable appropriate communications on the data center 30, 40.

The memory device 64 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 64 may incorporate electronic, magnetic, optical, and/or other types of storage media. The memory device 64 may have a distributed architecture, where various components are situated remotely from one another, but can be accessed by the processing device 62. The software in memory device 64 may include one or more software programs, each of which may include an ordered listing of executable instructions for implementing logical functions. The software in the memory device 64 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 64 may include a data store used to store data. In one example, the data store may be located internal to the control system 60 and may include, for example, an internal hard drive connected to the local interface 72 in the control system 60. Additionally, in another embodiment, the data store may be located external to the control system 60 and may include, for example, an external hard drive connected to the Input/Output (I/O) interfaces 66 (e.g., SCSI or USB connection). In a further embodiment, the data store may be connected to the control system 60 through a network and may include, for example, a network attached file server.

Moreover, some embodiments may include a non-transitory computer-readable storage medium having computer readable code stored in the memory device 64 for programming the control system 60 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 62 that, in response to such execution, cause the processing device 62 to perform a set of operations, steps, methods, processes, algorithms, functions, techniques, etc. as described herein for the various embodiments.

Simple Two-Node Network Example

FIG. 5 is a diagram illustrating an embodiment of a portion of a network 80 having at least a source node 82 (e.g., switch) and a destination node 84 (e.g., switch). The source node 82 includes UNIQ devices 86, VOQ devices 88, and NNIQ devices 90 configured for buffering data. The UNIQ devices 86 are configured to buffer data at or near UNI ports 92 of the source node 82, where four UNI ports 92 are shown in this example. The VOQ devices 88 are configured to buffer data internally within the source node 82. The NNIQ devices 90 are configured to buffer data at or near NNI ports 94 of the source node 82, where eight NNI ports 94 are shown in this example. The buffer memory devices of the source node 82 are therefore made up of the UNIQ devices 86, VOQ devices 88, and NNIQ devices 90.

Similarly, the destination node 84 includes UNIQ devices 96, VOQ devices 98, and NNIQ devices 100 configured for buffering data. The UNIQ devices 96 are configured to buffer data at or near UNI ports 102 of the destination node 84, where four UNI ports 102 are shown in this example. The VOQ devices 98 are configured to buffer data internally within the destination node 84. The NNIQ devices 100 are configured to buffer data at or near NNI ports 104 of the destination node 84, where eight NNI ports 104 are shown in this example. The buffer memory devices of the destination node 84 are therefore made up of the UNIQ devices 96, VOQ devices 98, and NNIQ devices 100.

Specific to the distributed nature of the buffer memory, new packet admission and congestion control techniques may be used to leverage the inherent properties thereof. Each node 82, 84 has a set of different queues, where the first set of queues is a relatively small User-Network Interface Queue (UNIQ) located on the switch egress ports. A second set of queues is a relatively small Network-Network Interface Queue (NNIQ) located on internal switch interconnect ports. A third set of queues is a relatively large Virtual Output Queue (VOQ) designed to handle incoming overflow packet bursts.

First, for simplicity, the operation is described for one Class of Service (COS). Multiple COSs may be accommodated in the network 80 by maintaining a separate set of VOQs for each COS. The technique used in the present disclosure, for instance, may include a proportionally higher transmission rate for higher COS packets.

Second, the approach of the present disclosure maintains sets that define which VOQs are associated with a specific egress. In one embodiment, the set may include all VOQs present in the network. In some cases, security or other policies may require physical traffic isolation to specific VOQs and only these VOQs would be included into the set.

This information may be distributed to all ingress and egress components that belong to a particular set.

The egress queue (e.g., UNIQ devices 96) of the destination node 84 is where incast congestion might occur. In contrast to prior solutions, the embodiment of FIG. 5 may be configured such that request/issue credits do not need to be considered for every single packet, which would normally create a substantial computational and network control message overload. Instead, the distributed buffer controller 74 may be configured to monitor the egress UNIQ (e.g., UNIQ devices 96) for possible congestion and issue the same control messages to all the distributed VOQs 88, 98 in the set. The specific details of the distributed buffer controller 74 may vary depending on the precise desired behavior, as well as various trade-offs of complexity to be considered, utilization balance among various queue types (e.g., VOQ, NNIQ, UNIQ), response speed, internal mechanisms available in switching ASICs, etc. What they have in common is monitoring of egress UNIQ for congestion. Also, the same message may be sent to all VOQs in a set for the UNIQ devices 96 to accelerate/decelerate packet transmission and/ or to start/stop packet transmission.

Extension to Distributed Buffering in Networks with Partial-Mesh Flat Internal Fabric Interconnect Distributed buffering is extended for implementation in flat networks well beyond the full-mesh (i.e., partial mesh). This drastically increases the number of potential distributed buffering storage sites with explosively growing number of nodes in variety of flat network architectures. The options for number of sites for distributed buffering storage may vary from just an ensemble of nearest neighboring nodes, through the nodes, for example, up to two hops away, and finally up to maximum number equal to the total number nodes in the flat topology network under specific case of consideration. These definitions effectively define VOQ sets discussed in the proceeding algorithm description.

Full-mesh networks are connectivity champions among all networks because they have minimum-minimorum diameter of one. This means that data transmission between any two sites is accomplished in just one hop. This is of great benefit for distributed buffering to be implemented in full-mesh flat topology networks. It will take just one hop to deliver the packets to each and every distributed buffering site in the network, allowing to extend the storage capacity to all the nodes of the network. Superior connectivity of the full-mesh topologies implies as well that packets will reach the egress site in the same just one hop after release from the VOQ, transiting through almost empty network fabric queues with minimal delay. This ensures low latency, negligible packet disordering and fairness of packet transmission.

Unfortunately, these benefits may come at the expense of a plethora of connection links and ports necessary for realization of full-mesh topology networks. They are not sparse. Specifically, for every node in full-mesh network to be connected to all other nodes, they need almost as many connections as the number n of nodes (i.e., n−1 to be precise). This limits the size of the full-mesh network that can be built with the limited radix switches to just radix+1. Flat network architectures beyond full-meshes may offer a variety of network sizes with low diameters.

Flat network architectures can vary from fully connected network of n nodes with as many as n−1 ports (similar to complete graph $K_n$ of degree d=n−1, having diameter k=1), to connected ring of n nodes with just 2 ports each and having diameter k equal to half of the number of nodes (equivalent to the cycle graph $C_n$). Within these two extremes number of nodes (e.g., switches) n varies with degree d and diameter k approximately as follows, with this empirical dependence illustrated below. As can be seen, the present systems are configured to accommodate networks with very large numbers of nodes having only three or four packet hops and small port counts.

$$\text{Node Count: } n = \frac{d^{0.8389k+0.1532}}{0.1467(k-2)^2 + 0.7669}$$

Figure 6:
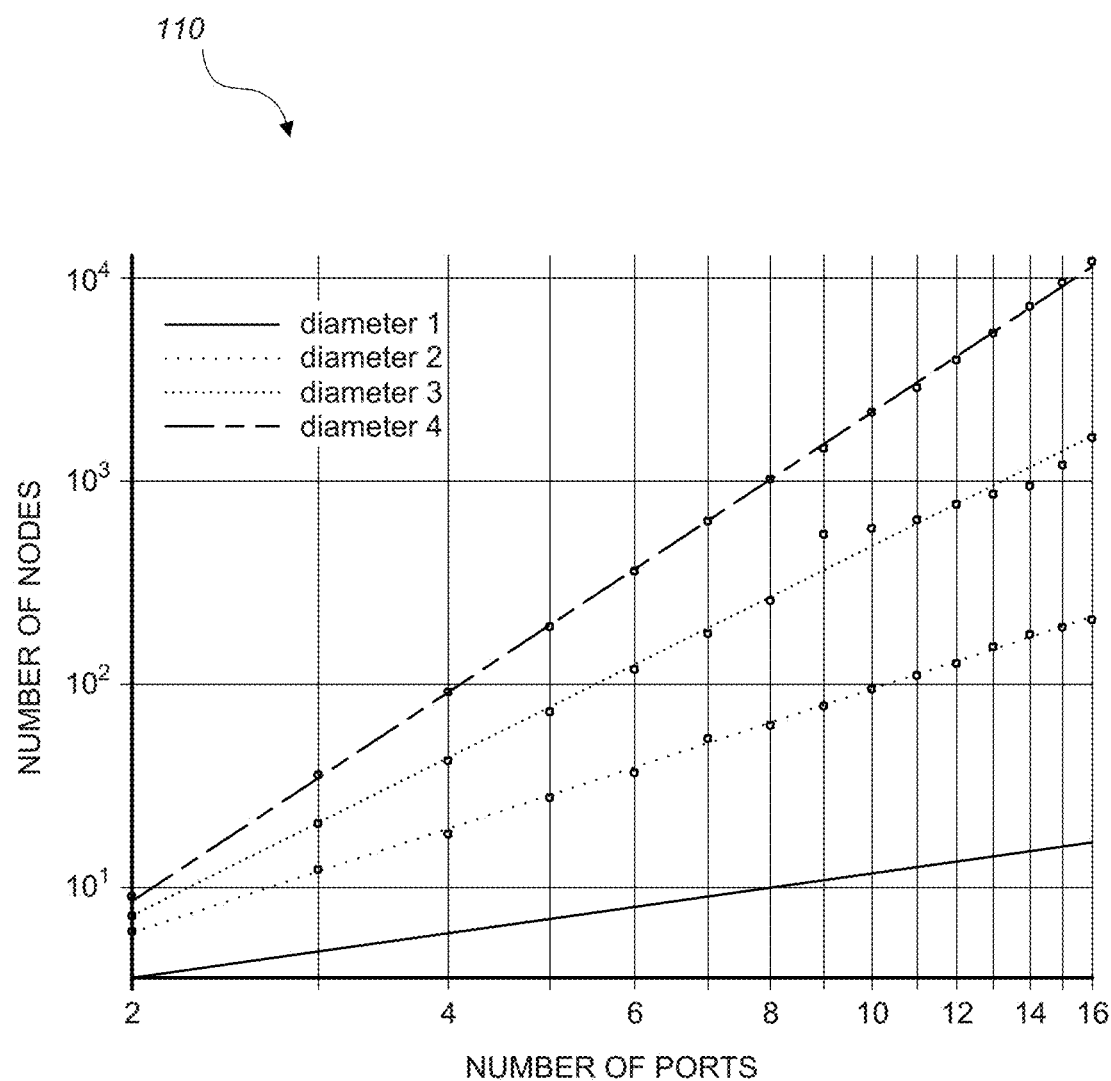
FIG. 6 is a plot of numbers of nodes versus numbers of NNI ports showing possible interconnected networks having different diameters, according to one example.

FIG. 6 is a plot 110 showing a number of nodes on one axis and a number of NNI ports on another axis. Both axes have a logarithmic scale to form the log-log plot 110. The plot 110 shows possible interconnected switches having different diameters. Flat network architectures can vary from fully connected network of n nodes with as many as n−1 ports (similar to a complete graph Kn of degree d=n−1, having diameter k=1), to connected ring of n nodes with just two ports each and having diameter k equal to half of the number of nodes (equivalent to the cycle graph Cn). Within these two extremes, number of nodes (i.e., switches) n varies with degree d and diameter k approximately as follows, with the above empirical dependence illustrated in FIG. 6. As shown, networks can be accommodated with very large numbers of switches having only 3 or 4 packet hops, and small port counts. Most likely, a configuration according to some embodiment may implement a full-mesh interconnect. However, other possibilities may be contemplated, including embodiments having a more traditional Clos structure, as well as Slim Fly, Dragonfly, etc. The various configurations can be specifically selected by a customer as desired. The plot 110 shows moderately sized diameter 1 (i.e., full-mesh) networks, while networks with a diameter of two, three, or four may include up to tens of thousands of nodes with a very limited number of ports.

Therefore, the present disclosure provides programmable switches with programmable interfaces for use in a data center or other section of a network. A programmable switch, which may be arranged in a network having a plurality of other switches, may include a plurality of programmable interfaces and a processing component (e.g., ASIC) configured to establish each of the plurality of programmable interfaces to operate as one of a user-facing interface and a fabric-facing interface. For example, in one embodiment, a programmable switch may be arranged in a network having a plurality of switches and an internal fabric. Again, the programmable switch may include a plurality of programmable interfaces, a buffer memory component (e.g., HBM unit), and a processing component (e.g., ASIC, FPGA, etc.). The processing component may be configured to establish each of the plurality of programmable interfaces to operate as one of a user-facing interface and a fabric-facing interface. Based on one or more programmable interfaces being established as one or more fabric-facing interfaces, the buffer memory device may be configured to store packets received from a user-facing interface of an interconnected switch of the plurality of switches via one or more hops into the internal fabric.

The network may be arranged with a flat internal fabric and full-mesh configuration. The flat internal fabric may include one or more of Direct Attach Cables (DACs), Active Electrical Cables (AECs), Active Optical Cables (AOCs), passive optical cables, silicon photonics, and Printed Circuit Board (PCB) traces. Based on one or more programmable interfaces being established as one or more user-facing interfaces, the processing component may further be configured to spread packets received at the one or more user-facing interfaces in a predetermined pattern, a pseudo-random pattern, an algorithmically determined pattern, a uniform pattern, or any other suitable types of strategic patterns for effective load distribution. In this way, the packets can be distributed to provide a balance to or improve the balancing of the internal network load to maximize or optimize the distribution, regardless of specific source-destination traffic pattern.

The processing component may be independent of any particular protocol or may be referred to as protocol agnostic. The processing component may be configured to adjust an oversubscription ratio. The programmable switch may also include a buffer memory component, which may further include a Virtual Output Queue (VOQ) construct and/or may be a High Bandwidth Memory (HBM) device (e.g., HBM unit).

The plurality of programmable interfaces may be dual-mode ports, whereby the processing component (e.g., ASIC) may be configured to establish each of the programmable interfaces to operate in either a user-port mode (UNI) or a network-port mode (NNI). The processing component may establish the programmable interfaces to operate in either of the user-port mode or the network-port mode based on a development stage of the network.

Therefore, according to the various embodiments of the present disclosure, systems are provided which include a distributed memory as described with respect to FIG. 2. Packets may take one hop inside the network before being buffered in VOQ memory. VOQ memory is allocated from a pool distributed among the intra-chassis routers, in contrast to traditional VOQ buffering at UNI packet entry ports only. Packets are sent to one-hop neighbors in round-robin manner or toward the neighbors with least-occupied memory via NNI ports. Excessive next-neighbor jumps are prevented by setting a credit-less transport flag when egress port output queues are below a threshold (e.g., chassis egress is running far from full). The systems may include corresponding features of protocol needed for exchanging information on memory occupancy, queue occupancy, egress port occupancy, etc. (e.g., related to control plane mentioned above).

Edge ASICs with a programmable egress port pipeline may be configured to enable packet order recovery. A flat network interconnect may include direct edge port ASIC interconnection, which in some cases may be a full-mesh configuration. In other embodiments, it can have an Expander or other similar type of topology.

Edge ASIC ports are programmable to support either UNI protocol rich features or NNI low-resource distributed forwarding features with fast bypass. The use of programmable ASIC interfaces and flexible control protocols provides chassis switch topology that can be custom optimized for particular customer requirements. In some embodiments, a box having one set of hardware components can be deployed which works in Expander mode and in Clos mode to allow operation in either model. Basically, dual-mode ports can be used that offer fabric or client interconnection. A network operator may potentially mix Clos and Expander cabling within one system as needed to achieve customer goals, accurate timing distribution, etc.

Other novel features of the present disclosure include a chassis switch configured for use in a partially populated network (e.g., Expander, etc.), where a chassis card count may have a growth strategy that relies on the addition of pass-through cards (e.g., shorts) with a small number of pass-through connections to increase interconnect bandwidth in an under-filled chassis. The topology interconnect and internal state of various memories, queues, etc. may be auto-discovered according to the embodiments of the present disclosure by a distributed and/or centralized control plane, in which the control system 60 may operate. To take advantage of the distributed fabric with many adjacent hops within a rack, a system may be configured by mixing PCB backplane traces, DAC cables, AEC cables, AOC cables, passive optical cables, and silicon photonics, depending on the length of a given link for the purpose of reducing bulk and cost.

Some of the benefits of the various embodiments discussed in the present disclosure may include providing substantial differentiation with higher cost systems and providing configurations that can operate with a lower cost, less power, and smaller footprint. The present systems also offer improved scalability, improved potential for a network growth trajectory, and ease in programming and changing the scale of the network. These systems may be used in various markets, including, for example, WAN routers/switches, intra-DC spine switches, Internet exchange cross-connects, and others.

Operation with Full-Mesh Network

Figure 7:
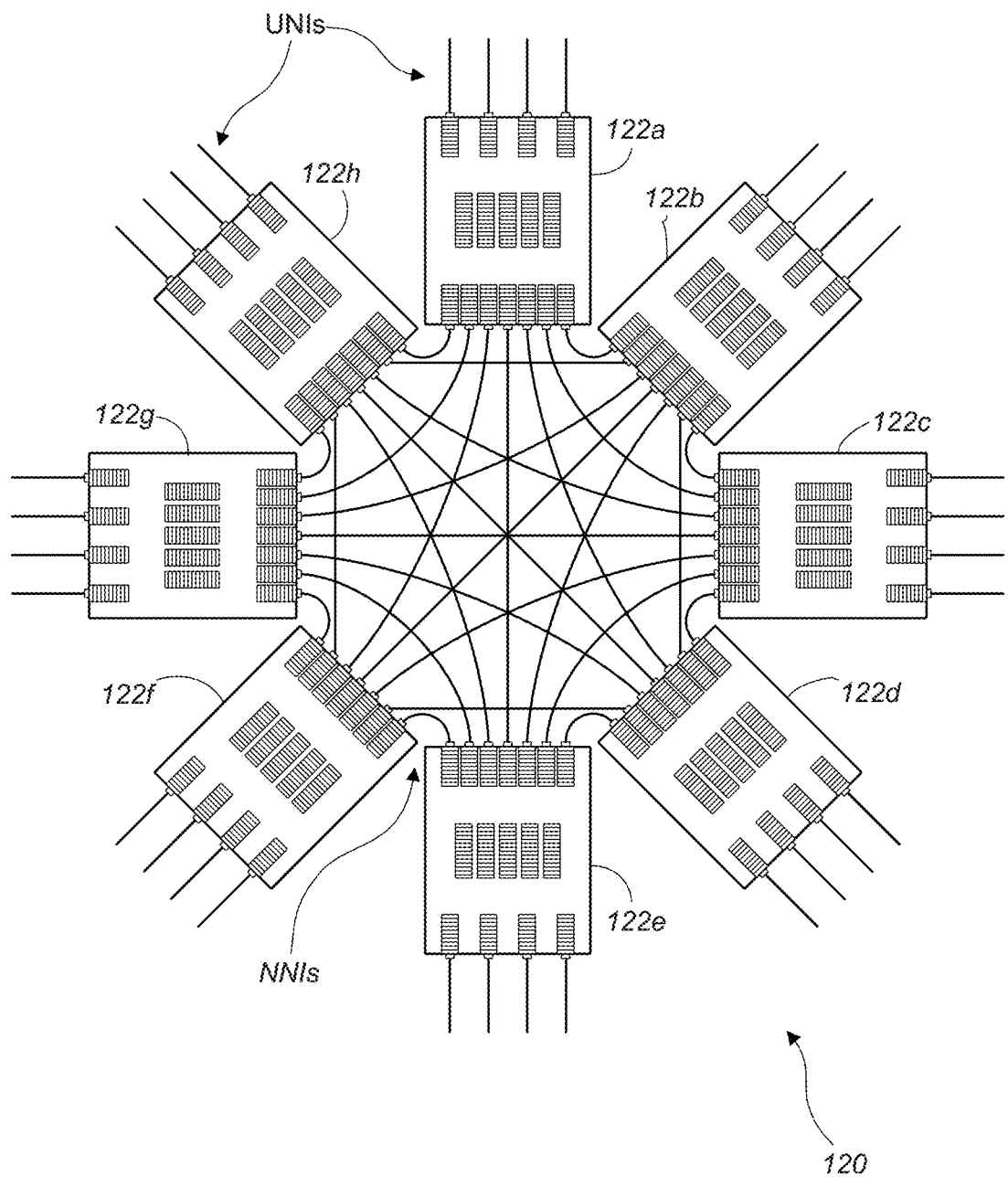
FIG. 7 is a diagram illustrating a full-mesh network, according to various embodiments of the present disclosure.

FIG. 7 is a diagram illustrating an embodiment of a full-mesh network 120 having eight switching nodes 122a, 122b, 122c, 122d, 122e, 122f, 122g, 122h. Each node 122 includes seven fabric-facing NNI ports and four user-facing UNI ports, similar to the ports 94, 104 (e.g., NNI ports) and ports 92, 102 (e.g., UNI ports) of nodes 82, 84 shown in FIG. 5.

Although incasts and bursts are quite troublesome phenomena, they nevertheless do not occur often. Thus, individual VOQs would be activated infrequently. Moreover, the probability to have VOQs activated in more than one switching node at the same time is small. The binomial probability of having any number out of the eight switching nodes 122 of the full-mesh network 120 having VOQs that are simultaneously active is plotted in FIG. 8.

Figure 8:
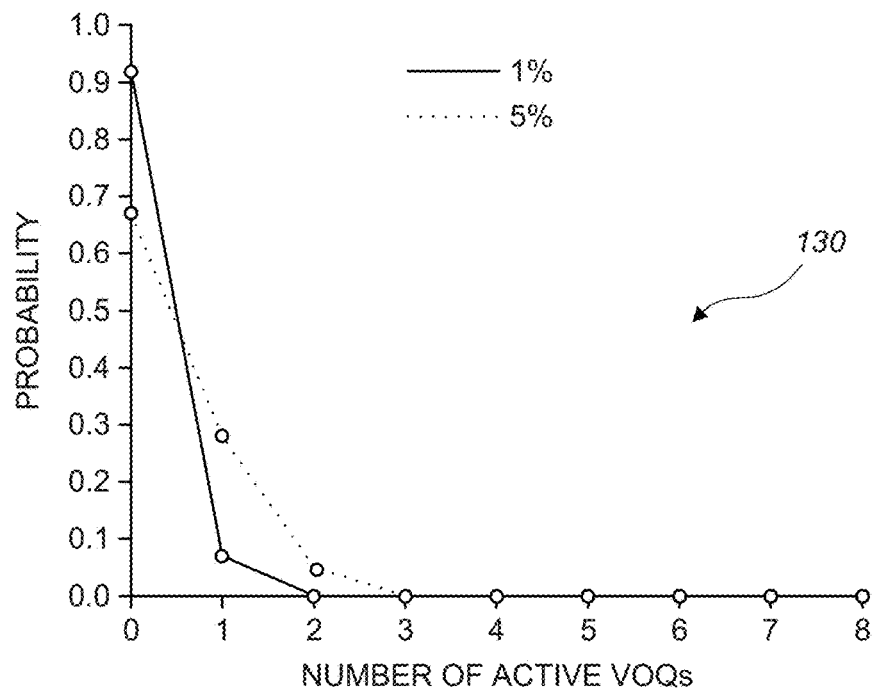
FIG. 8 is a plot illustrating the probability of Virtual Output Queue (VOQ) activity in the full-mesh network of FIG. 7, according to various embodiments.

FIG. 8 is a plot 130 illustrating the probability of Virtual Output Queue (VOQ) activity in the full-mesh network of FIG. 7 without distributed VOQ buffering. The plot 130 shows the probabilities of an individual VOQ to be active 1% of a time and 5% of a time. The plot 130 shows the likelihood of multiple VOQs staying active simultaneously is very low and diminishes rapidly, again emphasizing that this is for the case without distributed VOQ buffering. It can be understood from this plot that most VOQs would be empty and idle most of the time, which can be an expensive waste. The operating principle of distributing memory to allow buffering of excess data generated by incasting and data bursts is based on using VOQs located at multiple distributed sites and is illustrated in FIG. 9 below.

FIG. 9 is a diagram illustrating a portion of network 140 having a transmitter node 142 (e.g., a source node, ingress site, etc.), a receiving node 144 (e.g., a destination node, egress site, etc.), and an intermediate storage node 146. Distributed buffer memory devices are arranged in the transmitter node 142, receiving node 144, and intermediate storage node 146 in a manner similar to the arrangement in FIG. 5. However, in this embodiment, the intermediate storage node 146 is configured in the network 140 to enable storage in intermediate VOQ, even for cases when there is a direct connection between the transmitter node 142 and the receiving node 144.

When a congestion condition is detected at the receiving node 144 (egress site), the packets arriving at the transmitter node 142 through the UNI port are directed for distributed buffering to VOQ devices. These VOQ devices may be located at the transmitting node 142 itself, at the receiving node 144, and/or at the intermediate storing node 146. The VOQ devices may operate as FIFO buffers and subsequently release packets into the appropriate NNIQ devices for eventual delivery through the network 140 to the receiving node 144. In a case of distributed buffering at the receiving node 144, packets may be directed from the VOQ straight to the UNIQ devices of the receiving node 144. According to some scenarios, the client ingress node may be co-located with the overloaded client egress node at the same switching site, not illustrated in FIG. 9 to avoid clutter. In this case, excess packets can be distributed for VOQ buffering in the same common manner. We should note that packets are only stored in a VOQ buffer once when traversing the network.

Example 1: Discrete Control of VOQ Packet Release Rate

Figure 10:
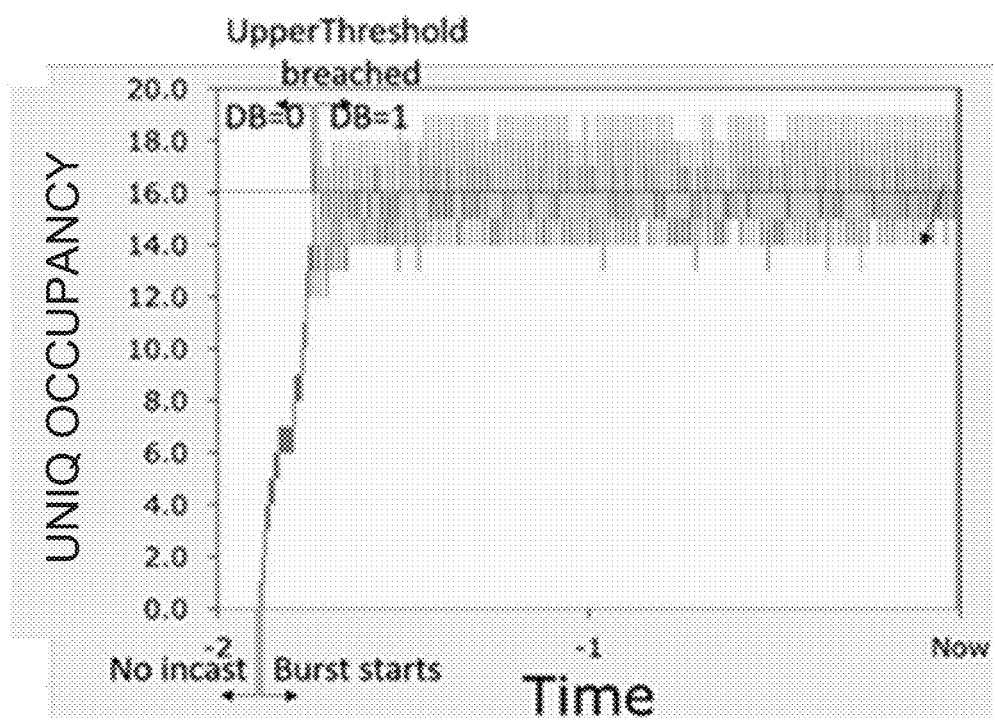
FIGS. 10-13 are plots illustrating the dynamics of User-Network Interface Queue (UNIQ) activity in implementations when the release of VOQ packets is controlled, according to various examples.

FIGS. 10-13 are plots illustrating the dynamics of User-Network Interface Queue (UNIQ) occupancy (or activity) in implementations when the release of VOQ packets is controlled, according to various examples. FIG. 10 is a plot showing the dynamics of UNIQ occupancy when the VOQ release rate is balanced.

Assume N is the number of VOQs providing distributed ingress buffering for a particular UNIQ. It is obvious that UNIQ will stay stabilized if the rate of packets release by VOQs is ideally balanced at exactly 1/Nth of the UNI transmission rate. This is illustrated in FIG. 10, where the onset of the incast causes the UNI queue to grow until it breaches the pre-set Upper Threshold=16 and this triggers a Distributed Buffering (DB) flag, where the flag is cleared (DB=0) when there is no incast situation and the distributed buffering is not needed and where the flag is set (DB=1) when there is an incast situation and the distributed buffering is utilized. The DB flag can be used to instruct packets to be directed to VOQs and released at a balanced rate of 1/Nth of the UNI transmission rate, resulting in UNIQ stabilizing at around the Upper Threshold. The fluctuations around Upper Threshold are due to stochastic nature of packet arrival. The ideal case depicted in FIG. 10 is prone to the disturbing influence of statistical drift and variation in the number of incasters, resulting in deviation from the fixed and stable UNI queue. Therefore, more adaptive control of the rate of packet release may be needed.

The rate of packet release from VOQs can be administered in a manner similar to the ones employed by conventional congestion control schemes utilizing the PD rate-based congestion control, such as DCTCP, DCQCN and DCQCN+. However, in the present disclosure, the rate of release of packets from VOQs is configured to be controlled, as opposed to using the transmission rate of the original data. A major difference between the distributed buffering of the present disclosure and the conventional TCP incast prevention lies in the independent and sporadic nature of packet transmission by individual incasters in TCP. On the other hand, the present disclosure provides distributed buffering in which the flow and supply of the released packets may be fixed and stable. This may then ensure the effective and reliable control of the rate of release of packets from VOQs.

The small UNIQ occupancy (before incast) prevents packet loss due to incast but might be less desirable for the task of packet order restoration, which may use a certain number of packets to be retained by the UNIQ. This can be accomplished by considering that, contrary to the deficient release rate, an excessive packet release rate, which may be higher than 1/Nth of the UNI transmission rate, would result in the gradual increase of UNIQ occupancy.

Figure 11:
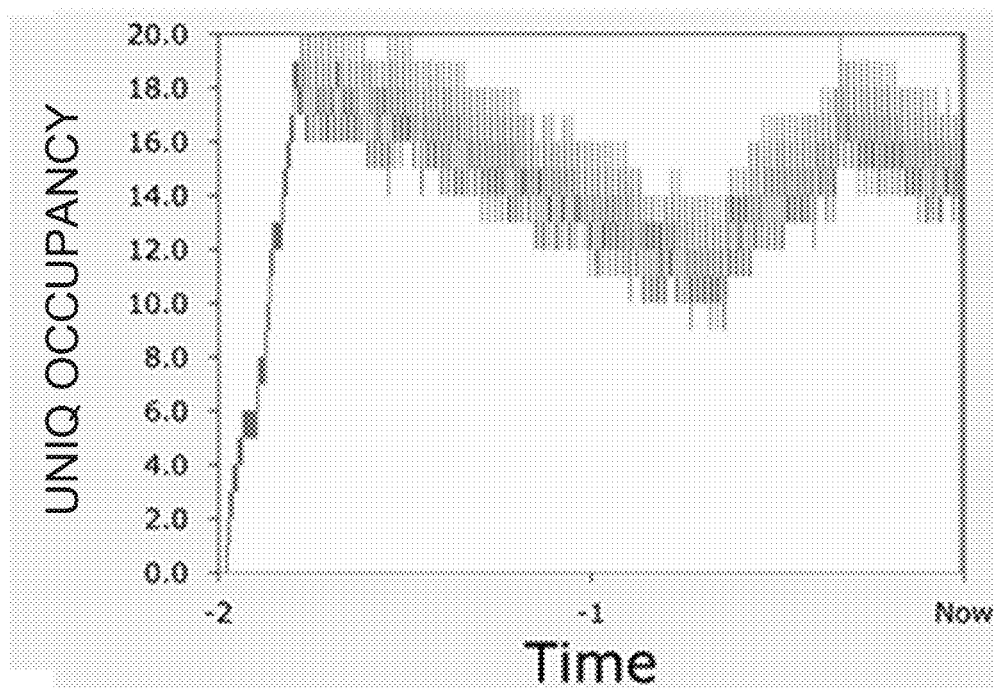

FIG. 11 is a plot of UNIQ occupancy showing the case when the release rate is periodically switched between a deficiency of −1.5% and an excess of 1.5% whenever the UNIQ reaches corresponding Upper Threshold and Lower Threshold, resulting in periodic sawtooth variation of the UNIQ occupancy.

Example 2: Packet Release Start/Stop Control

The distributed buffer controller 74 may be configured to control the starting and stopping of packet releases from VOQ devices in the situation where VOQs are implemented fully with expensive HBM elements and VOQ storage should be avoided as much as possible.

A "normal" state is when there is no incast or burst. All ingress packets are able to transmit through switch internal network at full rate without VOQ storage.

A second state occurs when the UNIQ first breaches the Upper Threshold. The Distributed Buffer flag is set to True (DB=1), corresponding to this particular UNIQ being sent to all sites (i.e., the set of distributed VOQs allowed by policy) instructing them to spread their incoming packets across this set. Packets are spread using a simple round-robin approach, assuring uniform VOQ fill and delivery fairness. The packets are buffered in VOQs and are not released from VOQs at this time. Because of this buffering, UNIQ can be emptied until it reaches the Lower Threshold.

A third state occurs when the UNIQ reaches the Lower Threshold. Packet release from VOQs is allowed at a rate greater than 1/N, which is high enough to ensure that UNIQ starts growing (i.e., more data occupies the UNIQ) until the UNIQ reaches the Upper Threshold.

The second and third states may be repeated until the incast or burst ceases. As a consequence, the VOQs eventually become empty and, subsequently, UNIQ becomes empty as well. At this point, the DB flag is set to False (DB=0), corresponding to the particular UNIQ being sent to all sites. This resets the state of operation to the first state (i.e., normal) and the process can resume for ingress packet transmission at full rate, bypassing VOQ storage.

Figure 12:
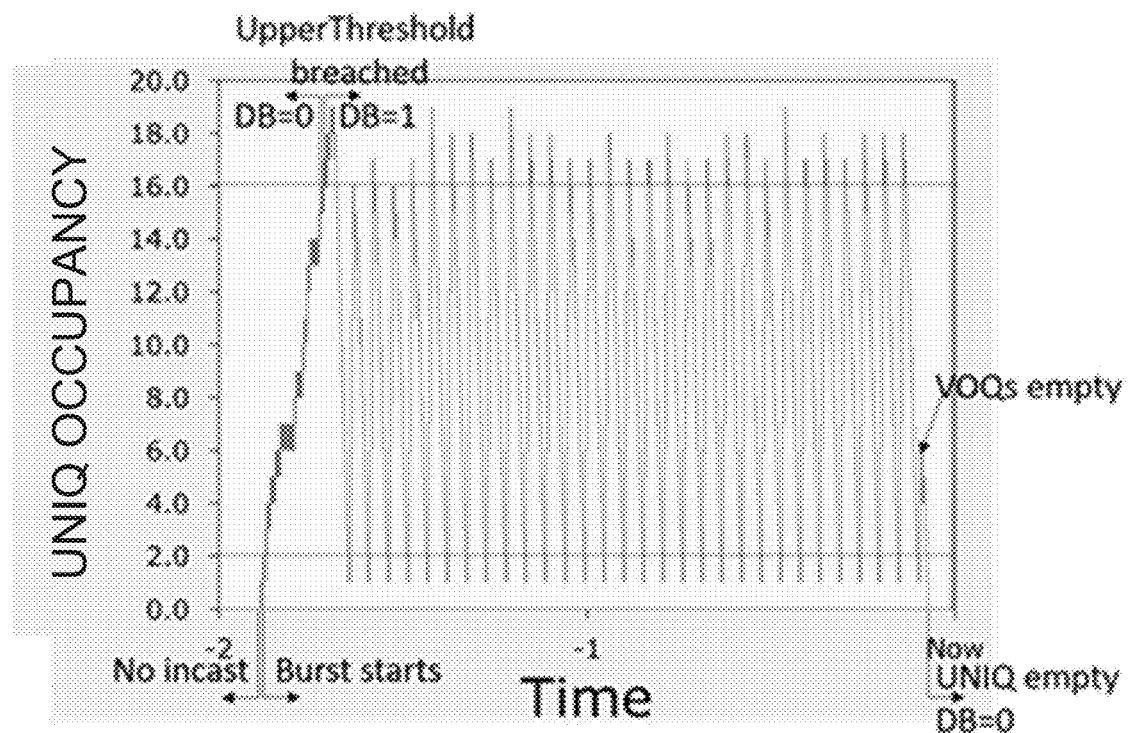

FIG. 12 is a plot showing the dynamics of UNIQ occupancy and the upper and lower thresholds. The plot shows the corresponding VOQ control messages during the control of start/stop packet release operations.

Figure 13:
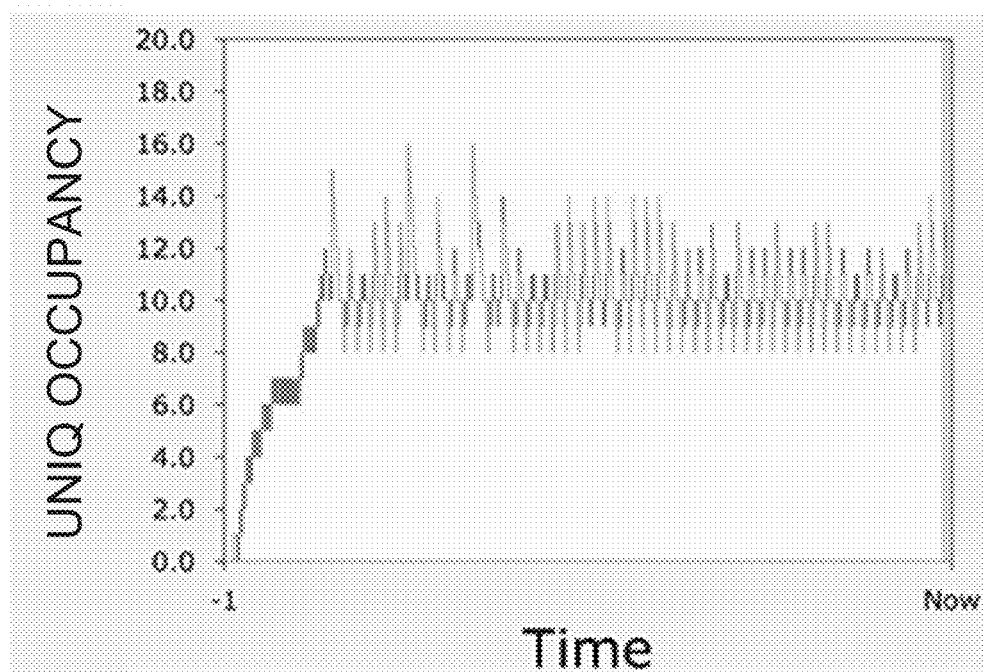

FIG. 13 is a plot showing the dynamics of UNIQ occupancy with a single threshold. It is also possible to contain the UNIQ occupancy tightly around a single Threshold (e.g., an Upper Threshold, a Lower Threshold, etc.) as illustrated in FIG. 13. In this case, the Start/Stop instructions may be similar to the case of FIG. 12 and may be issued immediately after a single threshold (e.g., Threshold=10) is breached one way or the other, resulting in the UNIQ occupancy being kept at around the single threshold. The excursions above and below the single threshold may be due to delays of the execution of the Start/Stop instructions.

Note that control messages may be sent unidirectionally, such as from egress to members of the set. Further, these messages may be sent at state transitions in order to minimize control complexity. If an unreliable protocol is used for messaging, state updates can also be resent periodically to assure delivery.

It may be expected that incast congestion conditions are fairly infrequent. Therefore, most of the time the ingress ports will simply forward packets to egress at full-rate and will not require any congestion control information. This is unlike credit based protocols, which require constant control messaging even under lightly loaded network conditions.

Since packets from any ingress in the defined set are sent to VOQs from the same set in a round-robin order, it will keep the VOQs at equal (or close to equal) occupancy and packet order will be generally preserved across any ingress and burst behavior. This assures general fairness of subsequent packet delivery to egress.

There is some probability that packets arriving at egress UNIQ will be out of order, which may be true for any approach using multiple paths. The network load may be spread quite uniformly across VOQs, assuring minimal level of mis-ordering. In order to handle residual mis-order, UNIQ depth is sized to accommodate out-of-order packet storage and subsequent in-order release. Thresholds can be set such that VOQ release is not stopped while UNIQ is waiting for out-of-order packets. This approach is described in the related application identified as U.S. application Ser. No. 16/565,541, filed Sep. 10, 2019, and entitled "Packet order recovery in a programmable edge switch in a data center network."

Example 3: Fixed Time Interval Messaging

UNIQ occupancy updates can be provided on a fixed time interval, rather than based on thresholds as in previous discussions. VOQ release rate is then set in inverse proportion to UNIQ occupancy, such that longer UNIQ produces a VOQ release slow down.

Extension for Split Memory

In some cases, VOQ may be implemented as a split memory. This split memory may include a shallow memory implemented directly on switch ASIC (e.g., inexpensive, low power memory). Also, the split memory may include deep memory implemented in off-ASIC HBM (e.g., expensive, high-power memory). Short-lived bursts may be stored in on-ASIC low-power memory, but as its capacity gets exceeded, packets are buffered in more expensive, but much deeper, HBM memory.

According to various embodiments, it may be assumed that ingress, egress, and internal network data rates are homogeneous. However, embodiments where link or port data rates are different may be accommodated by proportional scaling of thresholds and rate parameters.

The control techniques or algorithms of the distributed buffer controller 74 may include combining proportional and discrete mechanisms. This allows management of the packet storage and release with high efficiency and reliability. It may be noted that UNIQ occupancy does not drop to zero while VOQ has buffered packets. This assures that switches throughput the network are maintained at 100% even under heavy burst load.

Comparative Studies of Local Vs Distributed VOQ

Figure 14:
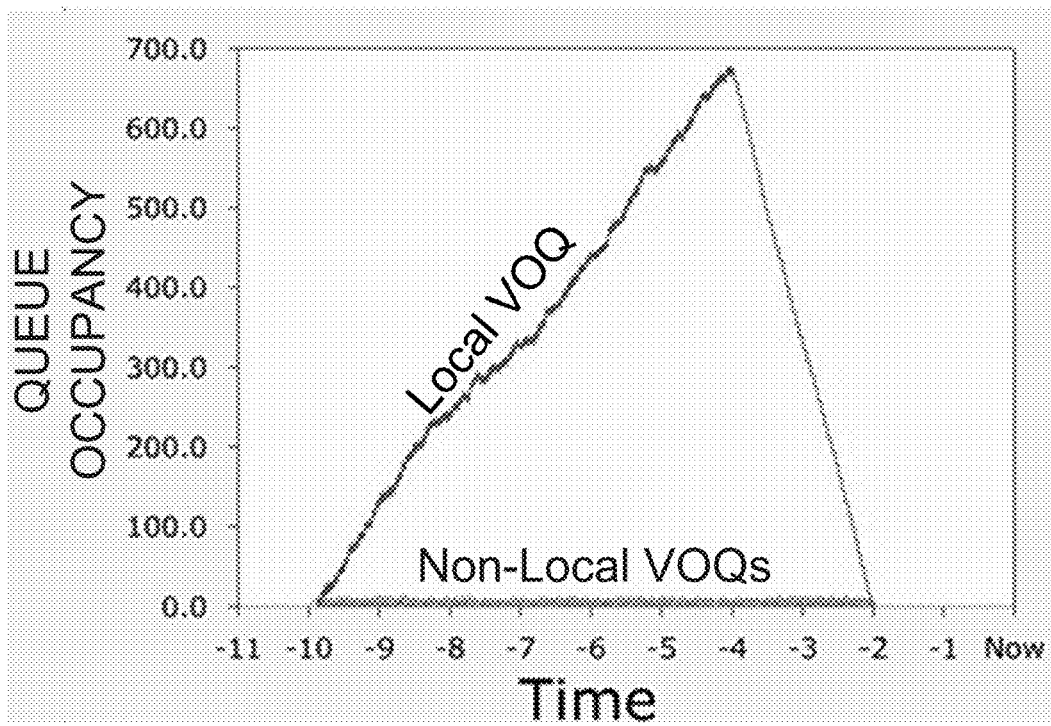
FIG. 14 is a plot illustrating the dynamics of VOQ and UNIQ activity during an incasting event in which local buffering is used, according to one example.
Figure 15:
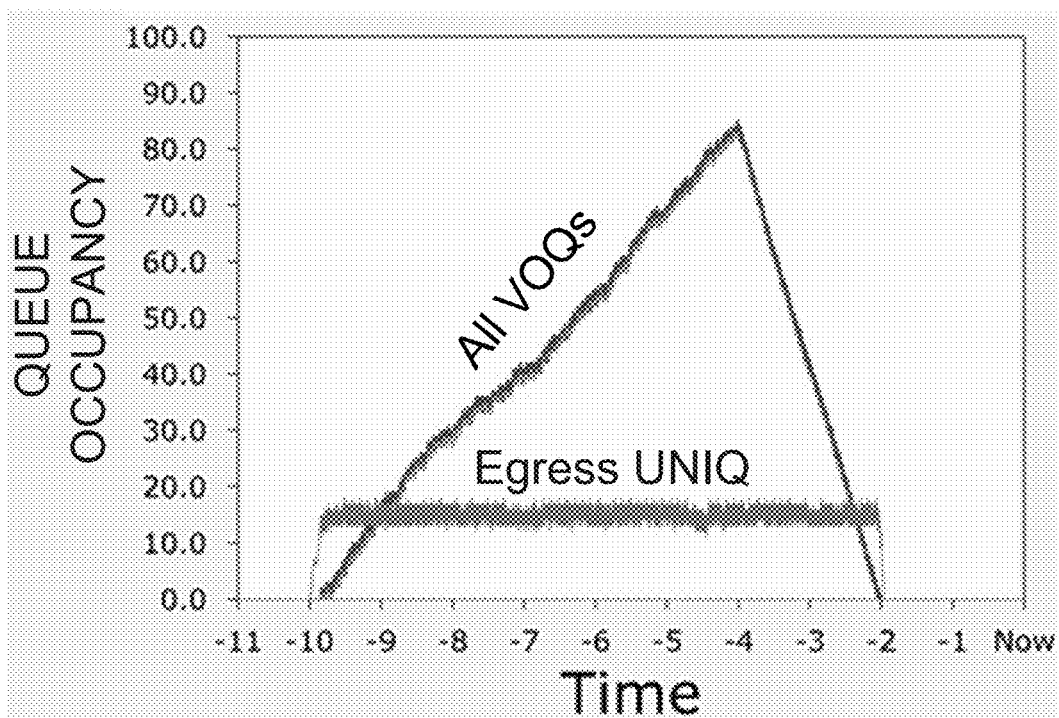
FIGS. 15-18 are plots illustrating the dynamics of VOQs and UNIQ activity during an incasting event in which distributed buffering is used, according to various examples.
Figure 16:
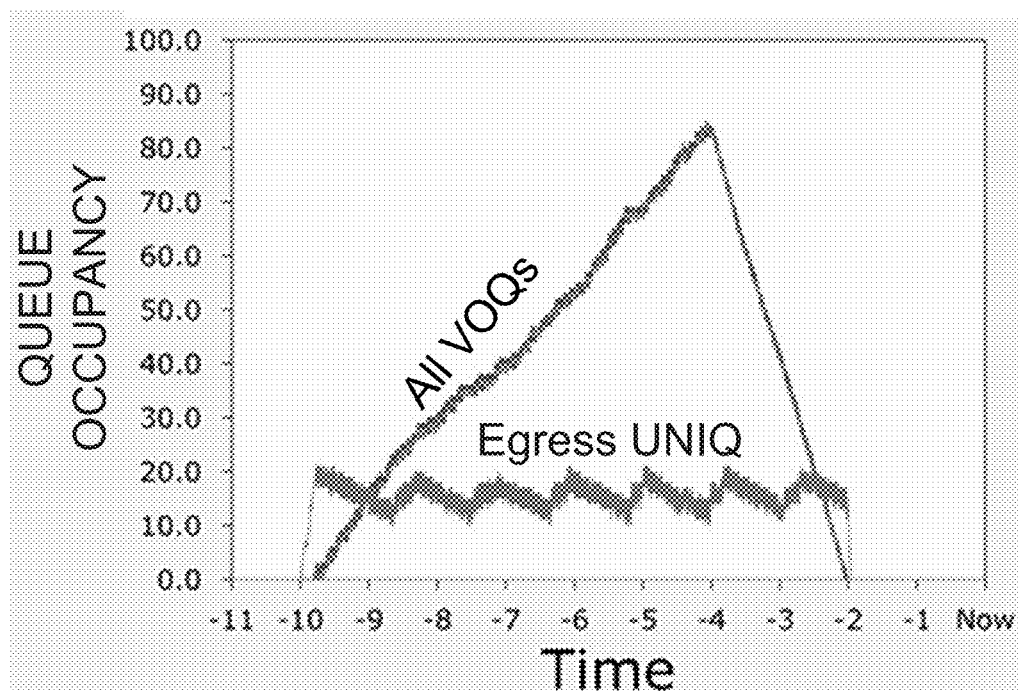
Figure 17:
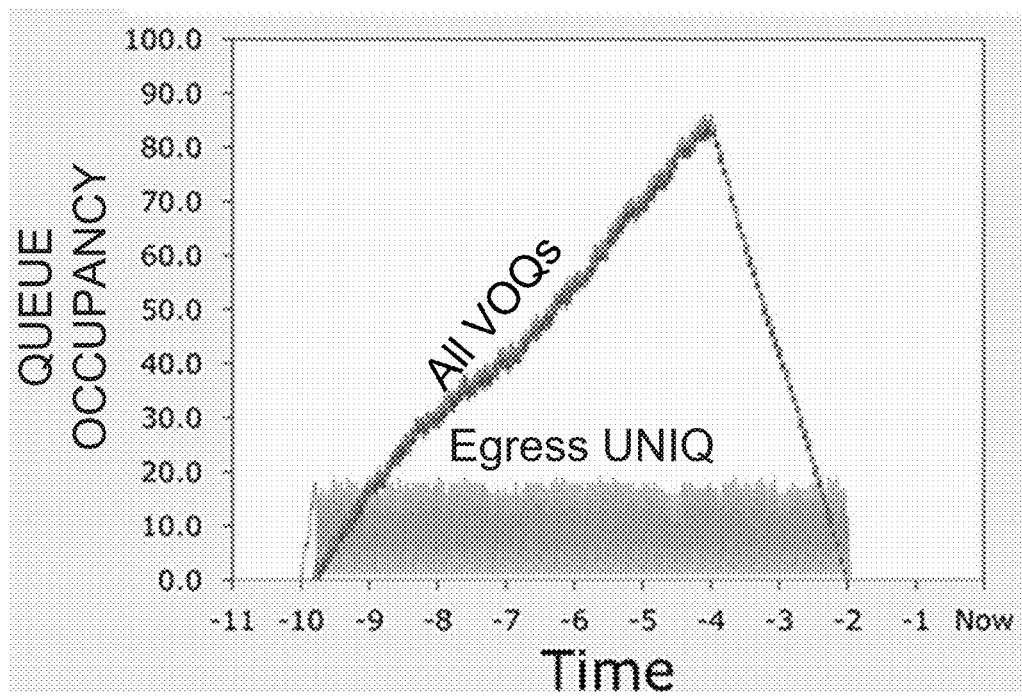
Figure 18:
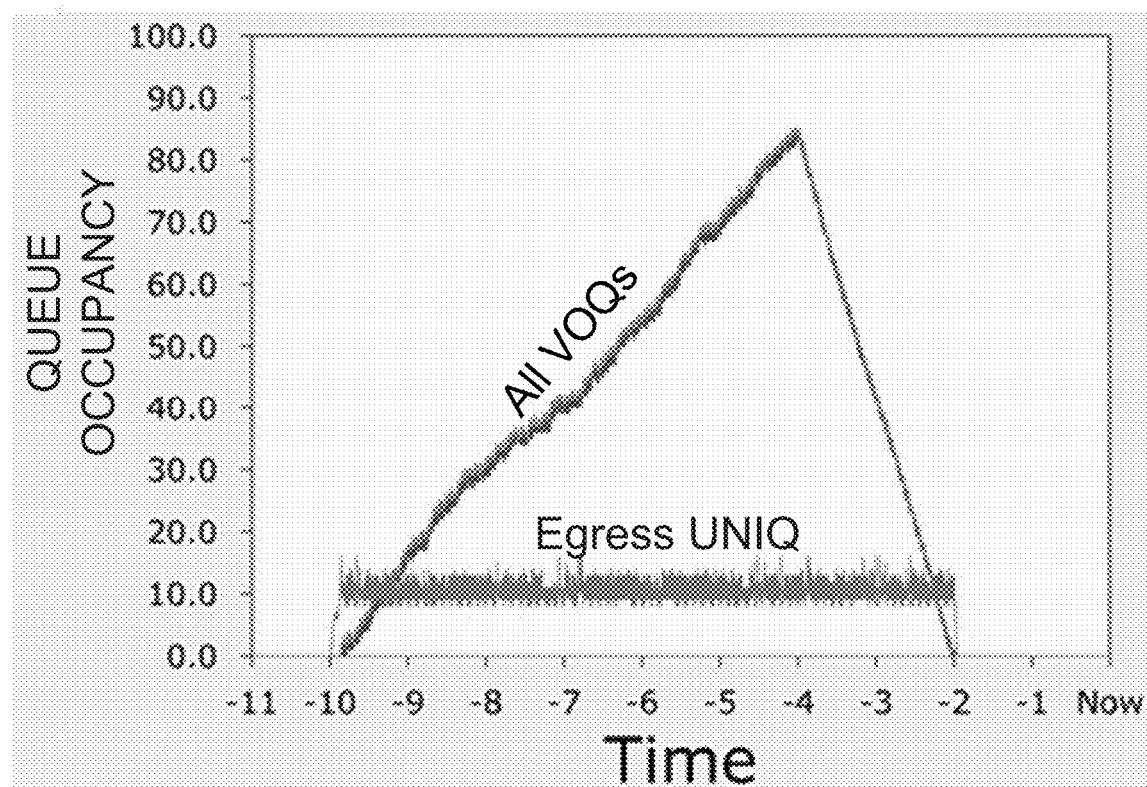

FIG. 14 is a plot of VOQ occupancy of a conventional approach during an incasting event in the case of purely local buffering of surplus packets. The performance of the conventional systems has been compared with the improvements described with respect to the systems of the present disclosure. The performance of the improved systems of the present disclosure are shown in FIGS. 15-18. It should be understood that the embodiments of the present disclosure are able to provide about a 10× reduction in HBM capacity and bandwidth for the network 120 shown in FIG. 7 having eight nodes. Larger networks can produce even better savings, proportional to the number of VOQs in a set. At the same time, the techniques, processes, algorithms of the present disclosure may be simple to implement and are robust in operation.

Comparative packet-level simulations have been performed on an exemplary network (i.e., network 120) using both local and distributive buffering during an event of an incast. The scenario of the simulation started with all clients communicating with each other pairwise (one-to-one) at 25% of maximum client packet transmission rate, resulting in perfectly stable lossless transmissions. Then, one of the client UNI egress ports was subjected to a sudden five-fold increase of the traffic load (125% of maximum packet transmission rate), causing the onset of a limited-time incasting event.

The burst starts at about the −10 time mark and causes the ingress local VOQ to grow at the rate of about 25% of maximum packet transmission rate (125%−100%), as shown in FIG. 14. At about time mark −4, the burst ceases and VOQ starts draining at about 75% of maximum packet transmission rate, causing it to empty about three time faster than to fill, while reaching almost 700 packet peak occupancy. Note that occupancy of the rest of VOQs causes only a small ripple close to zero.

FIGS. 15-18 are plots of VOQ occupancy for all eight switching and storing sites in case of distributed buffering of the surplus packets corresponding to the packet release control mechanisms described above with respect to FIGS. 10-13. Similar to the case of local buffering, the burst starts at about −10 time mark. This causes the affected egress UNIQ (gray) to grow in occupancy, and upon exceeding the pre-set threshold condition, the distributed buffering is initiated. The excess packets are being stored at all VOQs at all eight sites, spreading them evenly and uniformly in time, while the affected client UNI occupancy behaves in accordance with dynamics related to the specific packet release control mechanism.

The plots of FIGS. 15-18 illustrate the dynamics of VOQ activity during an incasting event in which distributed buffering is used. In the course of the burst, all eight VOQs are filled at the rate that is eight time smaller than in the case of local buffering. This results in a correspondingly lower peak VOQ occupancy as well as a reduced requirement for data transfer between switches and HBM that realizes VOQ.

Figure 19:
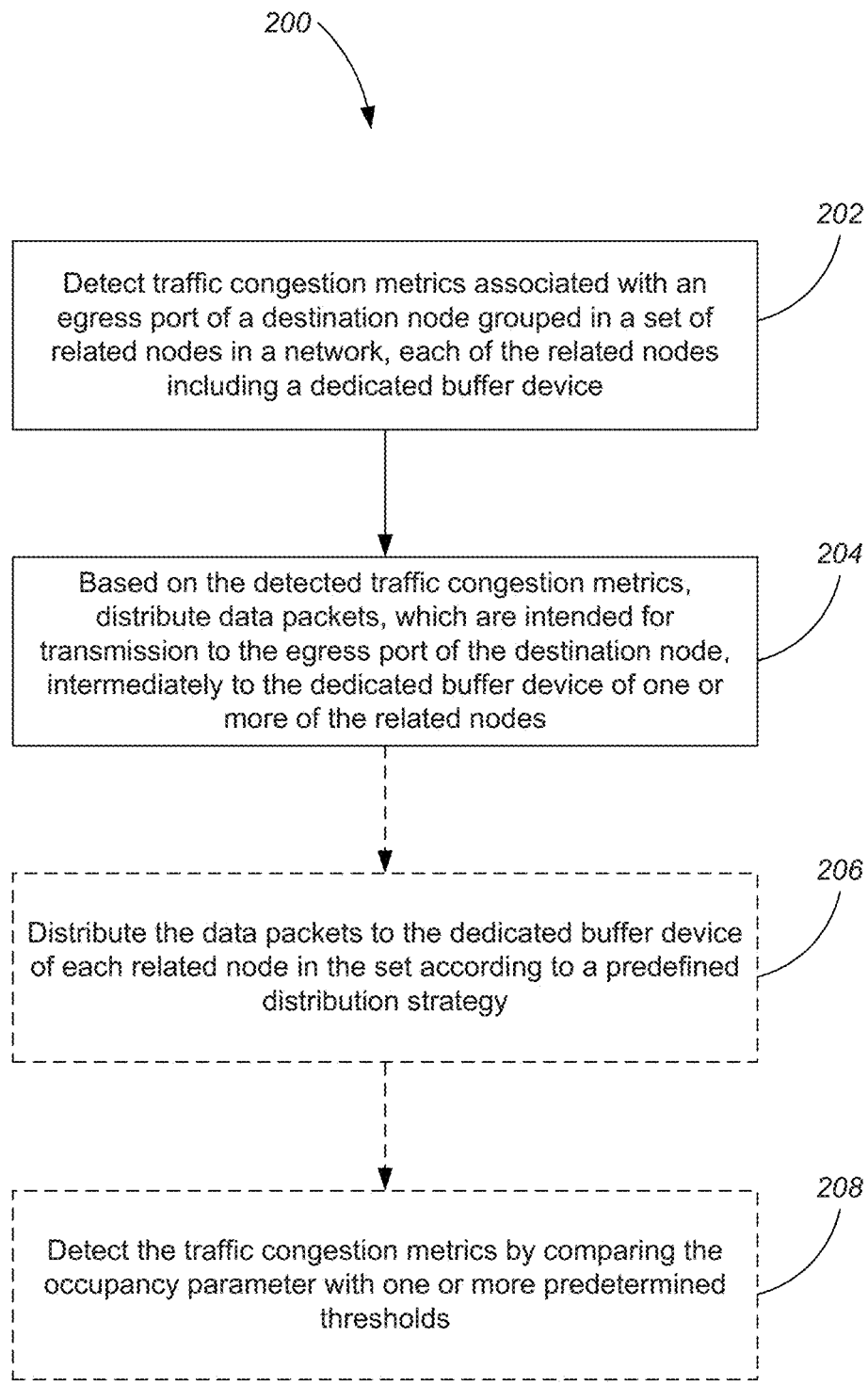
FIG. 19 is a flowchart of a process for controlling distributed buffers in a network to manage data packets.

FIG. 19 is a flowchart of a process 200 for controlling distributed buffers in a network to manage data packets. The process 200 can be implemented as a method having steps, as a control system configured to implement the steps, and as a non-transitory computer-readable medium configured to store logic having instructions that, when executed, enable a processing device to implement the steps.

The steps include detecting traffic congestion metrics associated with an egress port of a destination node grouped in a set of related nodes in a network, each of the related nodes including a dedicated buffer device (step 202); and based on the detected traffic congestion metrics, distributed data packets, which are intended for transmission to the egress port of the destination node, intermediately to the dedicated buffer device of one or more of the related nodes (step 204). The steps can also include distributing the data packets to the dedicated buffer device of each related node in the set according to a predefined distribution strategy (step 206).

The predefined distribution strategy can include a round-robin sequence. The set of related nodes can be arranged in a full-mesh configuration such that distribution to each related node includes one hop. The dedicated buffer device of each related node can be a Virtual Output Queue (VOQ) operating as a First-In First-Out (FIFO) buffer.

Each related node can further include a User-Network Interface (UNI) queue associated with one or more user-facing egress ports and a Network-Network Interface (NNI) queue. The traffic congestion metrics can be related to an occupancy parameter, and wherein the occupancy parameter can be based on an amount of data packets occupying an egress queue associated with the egress port of the destination node. The steps can further include detecting the traffic congestion metrics by comparing the occupancy parameter with one or more predetermined thresholds (step 208).

When the occupancy parameter is at an acceptable level when compared with the one or more predetermined thresholds, the steps can further include controlling the distribution of data packets to the egress queue of the destination node while bypassing the dedicated buffer device of the other related nodes in the set. The steps can further include buffering for distributing the data packets to the dedicated buffer device of the one or more related nodes and to control a release rate for releasing the data packets to the egress port of the destination node. The release rate can be a factor of an occupancy parameter of a queue associated with the egress port of the destination node.

The embodiments of the present disclosure may have many benefits. The chassis switch configurations of the present disclosure may be arranged with associated distributed VOQ protocol, which may have the following benefits relative to conventional switches. For example, the present embodiments may have about 20% lower cost and power consumption. The present embodiments may include a smaller footprint, may have more flexible and simpler cabling interconnect of internal switch connectivity, may have cheaper day one costs, may have more graceful growth scaling, and may have lower packet latency.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store logic having instructions that, when executed, enable a processing device to:
    detect traffic congestion metrics associated with an egress port of a destination node grouped in a set of related nodes in a network, each of the related nodes including a dedicated buffer queue, a User-Network Interface (UNI) queue associated with one or more user-facing egress ports, and a Network-Network Interface (NNI) queue associated with the egress port, and wherein the dedicated buffer queue is located between the UNI queue and the NNI queue;
    based on the detected traffic congestion metrics, distribute data packets, which are intended for transmission to the egress port of the destination node, intermediately to the dedicated buffer queue of one or more of the related nodes; and
    control a buffering for distributing the data packets to the dedicated buffer queue of the one or more related nodes and to control a release rate for releasing the data packets to the egress port of the destination node.

2. The non-transitory computer-readable medium of claim 1, wherein the instructions further enable the processing device to distribute the data packets to the dedicated buffer queue of each related node in the set according to a predefined distribution strategy.

3. The non-transitory computer-readable medium of claim 2, wherein the predefined distribution strategy includes a round-robin sequence.

4. The non-transitory computer-readable medium of claim 2, wherein the set of related nodes are arranged in a full-mesh configuration such that distribution to each related node includes one hop.

5. The non-transitory computer-readable medium of claim 1, wherein the dedicated buffer queue of each related node is a Virtual Output Queue (VOQ) operating as a First-In First-Out (FIFO) buffer.

6. The non-transitory computer-readable medium of claim 1, wherein the traffic congestion metrics are related to an occupancy parameter, and wherein the occupancy parameter is based on an amount of data packets occupying an egress queue associated with the egress port of the destination node.

7. The non-transitory computer-readable medium of claim 6, wherein the instructions further enable the processing device to detect the traffic congestion metrics by comparing the occupancy parameter with one or more predetermined thresholds.

8. The non-transitory computer-readable medium of claim 7, wherein, when the occupancy parameter is at an acceptable level when compared with the one or more predetermined thresholds, the instructions further enable the processing device to control the distribution of data packets to the egress queue of the destination node while bypassing the dedicated buffer queue of the other related nodes in the set.

9. The non-transitory computer-readable medium of claim 1, wherein the release rate is a factor of an occupancy parameter of a queue associated with the egress port of the destination node.

10. A control system comprising:
    a network interface configured to communicate with a plurality of related nodes grouped in a set of nodes in a network, each related node including a dedicated buffer queue, a User-Network Interface (UNI) queue associated with one or more user-facing egress ports, and a Network-Network Interface (NNI) queue associated with the egress port, and wherein the dedicated buffer queue is located between the UNI queue and the NNI queue;
    a processing device in communication with the network interface; and
    a memory device configured to store logic having instructions that, when executed, enable the processing device to
    detect traffic congestion metrics associated with an egress port of a destination node of the plurality of nodes,
    based on the detected traffic congestion metrics, distribute data packets, which are intended for transmission to the egress port of the destination node, intermediately to the dedicated buffer queue of one or more of the related nodes, and
    control a buffering for distributing the data packets to the dedicated buffer queue of the one or more related nodes and to control a release rate for releasing the data packets to the egress port of the destination node.

11. The control system of claim 10, wherein the instructions further enable the processing device to distribute the data packets to the dedicated buffer queue of each related node in the set according to a predefined distribution strategy.

12. The control system of claim 11, wherein the predefined distribution strategy includes a round-robin sequence.

13. The control system of claim 11, wherein the set of related nodes are arranged in a full-mesh configuration such that distribution to each related node includes one hop.

14. The control system of claim 10, wherein the dedicated buffer queue of each related node is a Virtual Output Queue (VOQ) operating as a First-In First-Out (FIFO) buffer.

15. A method comprising the steps of:
detecting traffic congestion metrics associated with an egress port of a destination node grouped in a set of related nodes in a network, each of the related nodes including a dedicated buffer queue, a User-Network Interface (UNI) queue associated with one or more user-facing egress ports, and a Network-Network Interface (NNI) queue associated with the egress port, and wherein the dedicated buffer queue is located between the UNI queue and the NNI queue;
based on the detected traffic congestion metrics, distributing data packets, which are intended for transmission to the egress port of the destination node, intermediately to the dedicated buffer queue of one or more of the related nodes;
controlling a buffering for distributing the data packets to the dedicated buffer queue of the one or more related nodes; and
controlling a release rate for releasing the data packets to the egress port or dedicated buffer queue of the destination node.

16. The method of claim 15, wherein the traffic congestion metrics are related to an occupancy parameter based on an amount of data packets occupying an egress queue associated with the egress port of the destination node, wherein the step of detecting the traffic congestion metrics includes the step of comparing the occupancy parameter with one or more predetermined thresholds, and wherein, when the occupancy parameter is at an acceptable level when compared with the one or more predetermined thresholds, the method further comprises the step of controlling the distribution of data packets to the egress queue of the destination node while bypassing the dedicated buffer queue of the other related nodes in the set.

17. The method of claim 15, wherein the release rate is a factor of an occupancy parameter of a queue associated with the egress port of the destination node.

* * * * *